United States Patent
Hou et al.

(10) Patent No.: US 12,312,431 B1
(45) Date of Patent: May 27, 2025

(54) METHOD FOR PREPARING STYRENE-ACRYLATE SILOXANE INTERPENETRATING POLYMER NETWORK COMPOSITE EMULSION

(71) Applicant: QINGDAO UNIVERSITY OF TECHNOLOGY, Qingdao (CN)

(72) Inventors: Dongshuai Hou, Qingdao (CN); Cong Wu, Qingdao (CN); Bing Yin, Qingdao (CN); Shaochun Li, Qingdao (CN); Pan Wang, Qingdao (CN); Xinpeng Wang, Qingdao (CN)

(73) Assignee: Qingdao University of Technology, Shandong (CN)

( * ) Notice: Subject to any disclaimer, the term of this patent is extended or adjusted under 35 U.S.C. 154(b) by 0 days.

(21) Appl. No.: 18/856,752

(22) PCT Filed: Dec. 28, 2023

(86) PCT No.: PCT/CN2023/142703
§ 371 (c)(1),
(2) Date: Oct. 14, 2024

(87) PCT Pub. No.: WO2024/164753
PCT Pub. Date: Aug. 15, 2024

(30) Foreign Application Priority Data

Feb. 10, 2023 (CN) .......................... 202310108511.4

(51) Int. Cl.
*C08F 283/12* (2006.01)
*C08F 2/00* (2006.01)
(Continued)

(52) U.S. Cl.
CPC ............ *C08F 283/12* (2013.01); *C08F 2/001* (2013.01); *C08F 2/26* (2013.01); *C08F 2/30* (2013.01);
(Continued)

(58) Field of Classification Search
CPC .. C09D 151/085; C09D 5/022; C09D 183/10; C08G 77/442; C08F 283/12
See application file for complete search history.

(56) References Cited

U.S. PATENT DOCUMENTS

2022/0235228 A1\* 7/2022 Watanabe ............ C09D 183/10

FOREIGN PATENT DOCUMENTS

| CN | 101649153 A | 2/2010 |
|---|---|---|
| CN | 102492085 A \* | 6/2012 |

(Continued)

OTHER PUBLICATIONS

Machine-generated English-language translation of CN-103059188-A.\*

(Continued)

*Primary Examiner* — Vu A Nguyen
(74) *Attorney, Agent, or Firm* — Reising Ethington P.C.

(57) ABSTRACT

A method for preparing a styrene-acrylate siloxane interpenetrating polymer network (IPN) composite emulsion is provided. The styrene-acrylate siloxane IPN composite emulsion prepared by the method can effectively improve the compatibility of the styrene-acrylate component and the siloxane component, and realize the gradient orientation distribution and ordered microphase separation of various styrene-acrylate molecules and siloxane molecules, thereby improving the synergistic working performance of a styrene-acrylate coating and a siloxane coating, and endowing the (Continued)

Comparative Example 1

Comparative Example 2 composite protective emulsion with excellent rheological properties, waterproof properties, anti-ion penetration properties, anti-carbonization properties, acid and alkali corrosion resistance, and anti-aging properties.

8 Claims, 14 Drawing Sheets

(51) Int. Cl.
    *C08F 2/26* (2006.01)
    *C08F 2/30* (2006.01)
    *C08F 2/38* (2006.01)
    *C08F 2/44* (2006.01)
    *C08K 3/36* (2006.01)
    *C08K 9/08* (2006.01)
    *C09D 5/02* (2006.01)
    *C09D 151/08* (2006.01)

(52) U.S. Cl.
    CPC ............... *C08F 2/38* (2013.01); *C08F 2/44* (2013.01); *C08K 3/36* (2013.01); *C08K 9/08* (2013.01); *C09D 5/022* (2013.01); *C09D 151/085* (2013.01)

(56) References Cited

FOREIGN PATENT DOCUMENTS

| CN | 103059188 A | * | 4/2013 |
| CN | 114195945 A | | 3/2022 |
| CN | 116023833 A | | 4/2023 |
| CN | 116285678 A | | 6/2023 |
| GB | 2620999 A | | 1/2024 |
| WO | 2020170272 A1 | | 8/2020 |

OTHER PUBLICATIONS

Machine-generated English-language translation of CN-1024920585-A.*
PCT Search Report, Int. Application No. PCT/CN2023/142703, Int. Application Date: Dec. 28, 2023, Applicant: Qingdao Technological University, Mail Date: Apr. 3, 2024.
Chinese Notification to Grant Patent Right for Invention and English Translation, CN Application No. 202310108511.4, Applicant: Qingdao University of Technology, Dated: Oct. 31, 2023.

* cited by examiner

Comparative Example 1

Comparative Example 2

Comparative Example 3

Example 1

Example 2

Example 3

Comparative Example 1

Comparative Example 2

Comparative Example 3

Example 1

Example 2

Example 3

Comparative Example 1

Comparative Example 2

Comparative Example 3

Example 1

Example 2

Example 3

Comparative Example 1

Comparative Example 2

Comparative Example 3

Example 1

Example 2

Example 3

METHOD FOR PREPARING STYRENE-ACRYLATE SILOXANE INTERPENETRATING POLYMER NETWORK COMPOSITE EMULSION

CROSS REFERENCE TO RELATED APPLICATION

The present application is a national stage application of International Patent Application No. PCT/CN2023/142703, filed on Dec. 28, 2023 claims priority to Chinese Patent Application No. 202310108511.4 filed with the China National Intellectual Property Administration (CNIPA) on Feb. 10, 2023 and entitled "METHOD FOR PREPARING STYRENE-ACRYLATE SILOXANE INTERPENETRATING POLYMER NETWORK COMPOSITE EMULSION". This disclosure of the two applications is incorporated herein by reference in its entirety.

TECHNICAL FIELD

The present disclosure relates to the technical field of protective coatings, in particular to a method for preparing a styrene-acrylate siloxane interpenetrating polymer network (IPN) composite emulsion.

BACKGROUND

Ion corrosion and various environmental degradation factors in coastal environments can directly threaten the safety and durability performance of concrete structures and significantly reduce the overall reliability of buildings. It is an important means to improve the durability performance of concrete materials in complex environments using environmentally friendly and efficient composite polymer anticorrosion coatings to protect the surface of cementitious materials.

Conventional polymer protective coatings include surface film-forming protective coatings and penetrating crystallization waterproof coatings. As a typical surface film-forming protective coating, the styrene-acrylate coating has the advantages of desirable chemical corrosion resistance, low cost, high weather resistance, and excellent isolation. However, the problems of poor environmental stability, low water resistance, and weak adhesion are also important factors restricting the protective effect of this coating. At the same time, since the styrene-acrylate coating has high shear viscosity and poor thixotropic properties, its leveling and film-forming properties cannot meet the durability protection requirements of concrete materials in harsh environments. In addition, penetrating crystallization waterproof coatings represented by silane coatings have the characteristics of high hydrophobicity, high leveling, and high permeability, and are suitable for surface protection of various cement materials.

Considering that styrene-acrylate coatings and silane coatings have functional complementary technical characteristics, the preparation of a styrene-acrylate siloxane composite coating can fully improve the waterproof performance and weather resistance of the above two components, as well as the bonding effect between the above two components and a cement substrate, enhance the physical and chemical stability of the composite protective coating, and extend the service life of the composite coating. The styrene-acrylate siloxane composite coating has the significant advantages of multi-effect protection and strong engineering practicality and has attracted the attention of many scholars and engineering technicians in recent years. However, there are significant differences in molecular structure and chemical properties between the styrene-acrylate component and the siloxane component, and their synthesis methods and surface treatment processes are also completely different, thus greatly limiting the large-scale preparation and practical engineering application of the styrene-acrylate siloxane composite coating. The styrene-acrylate siloxane composite coatings prepared in the prior art are all based on the seed emulsion polymerization method, where a silane monomer containing unsaturated bonds is used to prepare a cluster polymer through addition polymerization. Not only is a cross-linking effect between the styrene-acrylate component and the siloxane component poor, but also a degree of phase separation is low during film formation and curing of the coating, thereby seriously reducing a synergistic protective effect of the styrene-acrylate and siloxane on a substrate.

SUMMARY

In view of this, an object of the present disclosure is to provide a method for preparing a styrene-acrylate siloxane interpenetrating polymer network (IPN) composite emulsion. In the present disclosure, the styrene-acrylate siloxane IPN composite emulsion prepared by the method has an excellent protective effect.

To achieve the above object, the present disclosure provides the following technical solutions:

The present disclosure provides a method for preparing a styrene-acrylate siloxane IPN composite emulsion, including:

(1) mixing tetraethyl orthosilicate (TEOS), water, and anhydrous ethanol, and conducting hydrolysis in an alkaline environment to obtain a $SiO_2$ sol;

(2) mixing the $SiO_2$ sol, a buffer, and dopamine hydrochloride, and conducting aminohydroxylation polymerization under an alkaline condition to obtain modified $SiO_2$ particles;

(3) mixing styrene, an acrylate monomer, an acrylate functional monomer, and the modified SiO2 particles to obtain a styrene-acrylate monomer mixed solution I;

(4) mixing styrene, an acrylate monomer, vinylsilane, and the modified $SiO_2$ particles to obtain a styrene-acrylate monomer mixed solution II;

(5) mixing polydimethylsiloxane (PDMS) and liquid paraffin to obtain a silane monomer mixed solution III;

(6) mixing a hydrophobic silane and a regulating silane monomer to obtain a silane monomer mixed solution IV;

(7) mixing the styrene-acrylate monomer mixed solution I, an emulsifier, an initiator, and water, and conducting first addition polymerization to obtain a pre-emulsion A;

(8) mixing the styrene-acrylate monomer mixed solution II, an emulsifier, an initiator, and water, and conducting second addition polymerization to obtain a pre-emulsion B;

(9) mixing the silane monomer mixed solution III, an emulsifier, and water, and conducting third addition polymerization to obtain a pre-emulsion C;

(10) mixing the silane monomer mixed solution IV, an emulsifier, a dispersant, and water, and conducting fourth addition polymerization to obtain a pre-emulsion D;

(11) mixing the pre-emulsion A, the pre-emulsion B, and an initiator, and conducting first polycondensation to obtain a first polycondensation system;

(12) mixing the first polycondensation system, the pre-emulsion C, the modified $SiO_2$ particles, a silane polymerization inhibitor, and an organic solvent, and conducting second polycondensation to obtain a second polycondensation system; and

(13) mixing the second polycondensation system, the pre-emulsion D, the modified $SiO_2$ particles, and an organic solvent, and conducting third polycondensation to obtain the styrene-acrylate siloxane IPN composite emulsion; wherein steps (2), (4), (5), and (6) are conducted in any order;

steps (7), (8), (9), and (10) are conducted in any order; and in terms of a glass transition temperature, the styrene-acrylate monomer mixed solution I, the styrene-acrylate monomer mixed solution II, the silane monomer mixed solution III, and the silane monomer mixed solution IV are ranked as follows: the styrene-acrylate monomer mixed solution I>the styrene-acrylate monomer mixed solution II>the silane monomer mixed solution III>the silane monomer mixed solution IV.

In some embodiments, in step (3):

the acrylate monomer includes one or more selected from the group consisting of methyl acrylate, methyl methacrylate, ethyl acrylate, butyl acrylate, butyl methacrylate, acrylic acid, and hydroxyethyl acrylate, and the acrylate functional monomer includes one or more selected from the group consisting of hydroxyethyl acrylate and hydroxypropyl acrylate, in the styrene-acrylate monomer mixed solution I, the styrene has a mass percentage of 5% to 20%, the acrylate functional monomer has a mass percentage of 5% to 20%, and the modified $SiO_2$ particles has a mass percentage of 0.05% to 0.3%; and in step (4):

the acrylate monomer includes one or more selected from the group consisting of methyl acrylate, methyl methacrylate, ethyl acrylate, butyl acrylate, butyl methacrylate, acrylic acid, and hydroxyethyl acrylate, and the vinylsilane includes one or more selected from the group consisting of vinyltriethoxysilane (VTES), dimethoxymethylvinylsilane, vinyltriisopropoxysilane, and diethoxymethylvinylsilane, in the styrene-acrylate monomer mixed solution II, the styrene has a mass percentage of 5% to 20%, a mass of the vinylsilane is 10% to 30% of a mass of the acrylate monomer, and the modified $SiO_2$ particles has a mass percentage of 0.05% to 0.3%.

In some embodiments, in step (5):

a mass of the liquid paraffin is 10% to 30% of a mass of the PDMS;

the liquid paraffin has a carbon atomic number of 15 to 35; and in step (6):

the hydrophobic silane includes one or more selected from the group consisting of n-octyltrimethoxysilane, n-octyltriethoxysilane, dodecyltrimethoxysilane, dodecyltriethoxysilane, and hexadecyltrimethoxysilane;

the regulating silane monomer includes one or more selected from the group consisting of diphenyldimethoxysilane, diphenyldiethoxysilane, dimethyldimethoxysilane, and dimethyldiethoxysilane; and a mass of the regulating silane monomer is 3% to 30% of a mass of the hydrophobic silane.

In some embodiments, in step (7):

the emulsifier includes one or more selected from the group consisting of OP-10, sodium dodecyl sulfate, sodium dodecyl sulfonate, and sodium dodecyl benzene sulfonate (SDBS), and a mass of the emulsifier is 2% to 8% of a mass of the styrene-acrylate monomer mixed solution I;

the initiator includes one or more selected from the group consisting of sodium persulfate, ammonium persulfate, potassium persulfate, azobisisobutyronitrile (AIBN), and dimethyl azobisisobutyrate, and a mass of the initiator is 0.2% to 1.0% of the mass of the styrene-acrylate monomer mixed solution I; and the first addition polymerization is conducted under a pH value of 7.5 to 8.3, and the first addition polymerization is conducted at a temperature of 70° C. to 85° C. for 20 min to 2 h.

In some embodiments, in step (8):

the emulsifier includes one or more selected from the group consisting of OP-10, sodium dodecyl sulfate, sodium dodecyl sulfonate, and SDBS, and a mass of the emulsifier is 2% to 8% of a mass of the styrene-acrylate monomer mixed solution II;

a type and a mass of the initiator are consistent with those in step (7); and the second addition polymerization is conducted under a pH value of 7.5 to 8.3, and the second addition polymerization is conducted at a temperature of 75° C. to 85° C. for 20 min to 2 h.

In some embodiments, in step (9):

the emulsifier includes one or more selected from the group consisting of OP-10, Peregal, Span 60, Span 80, Tween 60, and Tween 80, and a mass of the emulsifier is 2% to 8% of a mass of the silane monomer mixed solution III; and the third addition polymerization is conducted at a temperature of 40° C. to 60° C. for 20 min to 1 h.

In some embodiments, in step (10):

the emulsifier includes one or more selected from the group consisting of OP-10, Peregal, Span 60, Span 80, Tween 60, and Tween 80, and a mass of the emulsifier is 2% to 8% of a mass of the silane monomer mixed solution IV;

the dispersant includes one or more selected from the group consisting of sodium dodecyl sulfate, sodium dodecyl sulfonate, SDBS, polyvinyl alcohol (PVA), polyvinylpyrrolidone (PVP), polyethylene glycol (PEG), and glycerol, and a mass of the dispersant is 0.5% to 10% of the mass of the silane monomer mixed solution IV; and the fourth addition polymerization is conducted at a temperature of 30° C. to 50° C. for 20 min to 1 h.

In some embodiments, in step (11):

a type and a mass of the initiator are consistent with those in step (8); and a mass of the initiator is 0.2% to 1% of a mass of the styrene-acrylate monomer mixed solution I; and the first polycondensation is conducted at a temperature of 75° C. to 85° C. for 1 h to 3 h.

In some embodiments, in step (12):

a mass of the modified $SiO_2$ particles is 0.05% to 0.5% of a mass of the pre-emulsion C;

the silane polymerization inhibitor includes one or more selected from the group consisting of methoxytrimethylsilane, triethoxymethylsilane, trimethylethoxysilane, and ethoxytriethylsilane, and a mass of the silane polymerization inhibitor is 2% to 15% of the mass of the pre-emulsion C;

the organic solvent includes one or more selected from the group consisting of butyl acetate, butyl propionate, trichloroethylene, ethylene glycol ether, and triethanolamine (TEA), and a mass of the organic solvent is 2% to 20% of the mass of the pre-emulsion C; and the second polycondensation is conducted at a temperature of 30° C. to 50° C. for 1 h to 2 h.

In some embodiments, in step (13):

a mass of the modified $SiO_2$ particles is 0.05% to 0.5% of a mass of the pre-emulsion D;

the organic solvent includes one or more selected from the group consisting of toluene, xylene, n-hexane, pentane, acetone, cyclohexanone, isopropanol, chloroform, trichloroethylene, and butanol, and a mass of the organic solvent is 2% to 20% of the mass of the pre-emulsion D; and the third polycondensation is conducted at a temperature of 30° C. to 50° C. for 0.5 h to 2 h.

The present disclosure provides a method for preparing a styrene-acrylate siloxane IPN composite emulsion, including: (1) mixing TEOS, water, and anhydrous ethanol, and conducting hydrolysis in an alkaline environment to obtain a $SiO_2$ sol; (2) mixing the $SiO_2$ sol, a buffer, and dopamine hydrochloride, and conducting aminohydroxylation polymerization under an alkaline condition to obtain modified $SiO_2$ particles; (3) mixing styrene, an acrylate monomer, an acrylate functional monomer, and the modified $SiO_2$ particles to obtain a styrene-acrylate monomer mixed solution I; (4) mixing styrene, an acrylate monomer, vinylsilane, and the modified $SiO_2$ particles to obtain a styrene-acrylate monomer mixed solution II; (5) mixing PDMS and liquid paraffin to obtain a silane monomer mixed solution III; (6) mixing a hydrophobic silane and a regulating silane monomer to obtain a silane monomer mixed solution IV; (7) mixing the styrene-acrylate monomer mixed solution I, an emulsifier, an initiator, and water, and conducting first addition polymerization to obtain a pre-emulsion A; (8) mixing the styrene-acrylate monomer mixed solution II, an emulsifier, an initiator, and water, and conducting second addition polymerization to obtain a pre-emulsion B; (9) mixing the silane monomer mixed solution III, an emulsifier, and water, and conducting third addition polymerization to obtain a pre-emulsion C; (10) mixing the silane monomer mixed solution IV, an emulsifier, a dispersant, and water, and conducting fourth addition polymerization to obtain a pre-emulsion D; (11) mixing the pre-emulsion A, the pre-emulsion B, and an initiator, and conducting first polycondensation to obtain a first polycondensation system; (12) mixing the first polycondensation system, the pre-emulsion C, the modified $SiO_2$ particles, a silane polymerization inhibitor, and an organic solvent, and conducting second polycondensation to obtain a second polycondensation system; and (13) mixing the second polycondensation system, the pre-emulsion D, the modified $SiO_2$ particles, and an organic solvent, and conducting third polycondensation to obtain the styrene-acrylate siloxane IPN composite emulsion; wherein steps (2), (4), (5), and (6) are conducted in any order; steps (7), (8), (9), and (10) are conducted in any order; and in terms of a glass transition temperature, the styrene-acrylate monomer mixed solution I, the styrene-acrylate monomer mixed solution II, the silane monomer mixed solution III, and the silane monomer mixed solution IV are ranked as follows: the styrene-acrylate monomer mixed solution I>the styrene-acrylate monomer mixed solution II>the silane monomer mixed solution III>the silane monomer mixed solution IV.

Compared with the prior art, the styrene-acrylate siloxane IPN composite emulsion prepared by the method provided in the present disclosure has the following excellent technical effects:

(1) In the present disclosure, the coating made of the styrene-acrylate siloxane IPN composite emulsion prepared by the method has excellent hydrophobic and waterproof properties.

In the styrene-acrylate siloxane IPN composite emulsion, the styrene-acrylate molecular cross-linking network is used as a main polymer structure, and a gradient-distributed hydrophobic siloxane small-molecule chain runs through the interior of the styrene-acrylate siloxane IPN composite emulsion. Due to the host-guest interaction and hydrophobic association, the styrene-acrylate siloxane IPN composite emulsion can not only form a relatively dense waterproof polymer coating on the surface of the cement material during the film-forming, but also form a stable novel hydration product structure inside the cementitious material through penetration crystallization, thereby effectively inhibiting the diffusion and transmission of water molecules in the external environment inside the matrix. In addition, since the internal styrene-acrylate molecular network as the main structure has a certain degree of hydrophilicity, the cohesive force and disordered entanglement between the siloxane molecules are weakened to a certain extent, such that hydrophobic long hydrocarbon chains in the siloxane molecules can stretch and move freely in the hydration layer of the latex particles in an orderly and sufficient manner. Importantly, each component in IPN has a high tendency for microphase separation, such that the styrene-acrylate component does not significantly affect the penetration of siloxane small molecules in the pores of the cement matrix gel, allowing the siloxane small molecules to stably combine with the cement hydration products to form a reliable hydrophobic layer.

(2) In the present disclosure, the coating made of the styrene-acrylate siloxane IPN composite emulsion prepared by the technical solutions has excellent leveling and film-forming properties.

The styrene-acrylate cross-linked network has high plastic deformation ability and hydrophilicity, which can reduce the degree of self-cross-linking between siloxane molecules and weaken their cohesive tendency, thus endowing the styrene-acrylate siloxane IPN composite emulsion with higher thixotropic properties. When the styrene-acrylate siloxane IPN composite emulsion is coated on the surface of the substrate, the shearing effect allows the polymer system to have relatively low viscosity and cohesion, such that there is an excellent leveling performance for cementitious material matrix with various surface morphologies. Furthermore, since the styrene-acrylate cross-linked network is permeated with gradient-distributed siloxane small molecules, there is a high bonding effect between the coating made of the styrene-acrylate siloxane IPN composite emulsion and the cementitious material matrix, which greatly ensures the integrity of the composite coating on the surface of the cementitious material matrix. In addition, the siloxane component lowers the glass transition temperature of the styrene-acrylate component to a certain extent, weakening the adverse effect of the evaporation of free water and adsorbed water on the curing shrinkage of the polymer coating during drying and film-forming on the coating made of the styrene-acrylate siloxane IPN composite emulsion.

(3) In the present disclosure, the coating made of the styrene-acrylate siloxane IPN composite emulsion prepared by the method has excellent resistance to chloride and sulfate corrosion ability.

The IPN system not only enhances the host-guest interaction and non-bonded interaction between the styrene-acrylate network and the siloxane chain, but also ensures a stable microphase separation state between the above two. After forming a film on the surface of the cement-based material, the styrene-acrylate siloxane IPN composite emulsion can not only form a relatively dense protective film on the surface of the cement matrix to isolate corrosive ions, but also penetrate into the gel pores of the cement-based material to form a stable hydrophobic layer. The diffusion and migration of corrosive ions in the cementitious material matrix must depend on water as a transmission medium. On one hand, IPN enhances the cross-linking degree between styrene-acrylate molecules and siloxane molecules; on the other hand, the IPN improves the hydrophobicity and surface adhesion of siloxane molecules, thus weakening the diffusion and transmission of water molecules and corrosive ions such as chloride ions and sulfate ions on the concrete surface and inside the capillaries.

(4) In the present disclosure, the coating made of the styrene-acrylate siloxane IPN composite emulsion prepared by the method has excellent anti-carbonization performance.

The coating made of the styrene-acrylate siloxane IPN composite emulsion on the surface of cement-based materials has high compactness, which is not only attributed to the high cross-linking degree of the styrene-acrylate network, but also to the fact that the siloxane molecules form a stable and dense novel hydration product layer on the surface of the cement matrix through penetration crystallization, thus greatly inhibiting the diffusion of $CO_2$ in the capillary pores of the concrete and maintains the alkaline environment inside the concrete. At the same time, since the styrene-acrylate siloxane IPN composite emulsion has high leveling, film-forming, and bonding properties, there is an extremely low proportion of inherent defects and shrinkage cracks in the polymer coating, avoiding the diffusion and migration of $CO_2$ along the pores and bonding interfaces of the polymer coating. In addition, since the coating made of the styrene-acrylate siloxane IPN composite emulsion has excellent hydrophobic and water-resistant properties, the directional diffusion of water-soluble $CO_2$ is inhibited in the pores of the coating and the cracks on the surface of the substrate.

(5) In the present disclosure, the coating made of the styrene-acrylate siloxane IPN composite emulsion prepared by the method can be applied to various types of concrete and cement-based materials.

The styrene-acrylate siloxane IPN composite emulsion has excellent leveling and permeability, and the IPN structure also gives the siloxane small molecules higher reactivity and more significant microphase separation characteristics. Therefore, the composite emulsion can adapt to various complex rough interfaces and produce strong bonding properties, and can form a long-lasting and effective protective layer on the surface of various cement-based materials. The composite emulsion has a desirable protective effect whether it is high-strength and high-performance concrete, porous foam concrete, or concrete with cracks.

(6) In the present disclosure, the coating made of the styrene-acrylate siloxane IPN composite emulsion prepared by the method has excellent anti-aging properties.

The styrene-acrylate siloxane IPN composite emulsion not only ensures a desirable anti-ultraviolet aging performance of the styrene-acrylate siloxane composite component, but also promotes strong grafting, cross-linking, and association between styrene-acrylate molecules and siloxane molecules, thereby improving their synergistic working performance and environmental adaptability. The styrene-acrylate siloxane IPN composite emulsion has a higher cross-linking density, which is also conducive to the heat-resistant and radiation-resistant anti-aging properties of the coating made of the styrene-acrylate siloxane IPN composite emulsion. At the same time, based on the formation of a nano-scale or submicro-scale gradient thermodynamic structure between the components, the styrene-acrylate siloxane IPN composite emulsion can more effectively resist the degradation effect of external aging factors on the composite coating.

DETAILED DESCRIPTION OF THE EMBODIMENTS

Figure 1A:
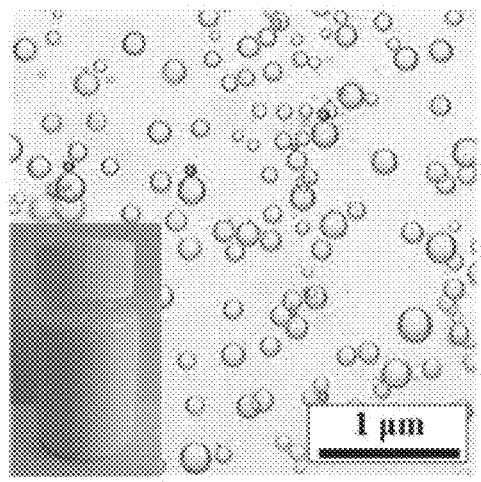
FIG. 1A to FIG. 1F show apparent morphology photos and optical microscope morphology photos of the composite emulsions obtained in each experimental group.
Figure 1B:
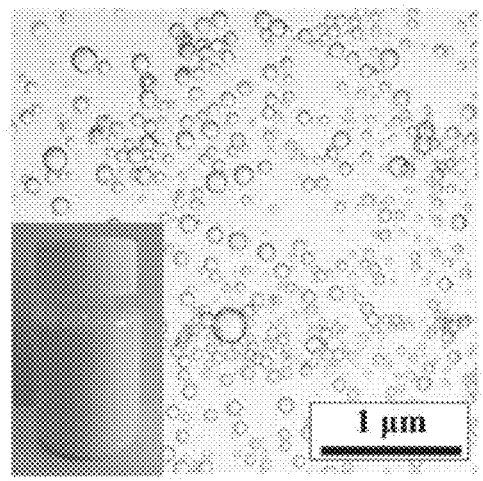
Figure 1C:
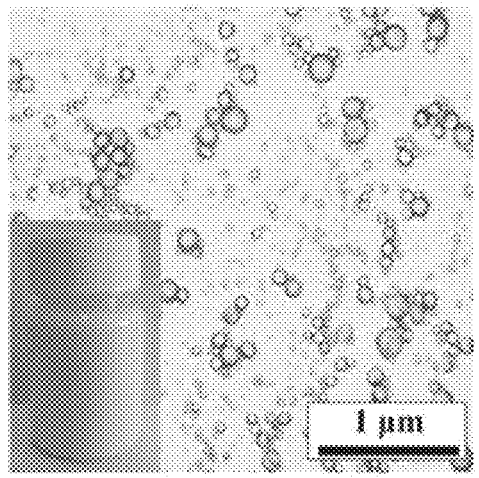
Figure 1D:
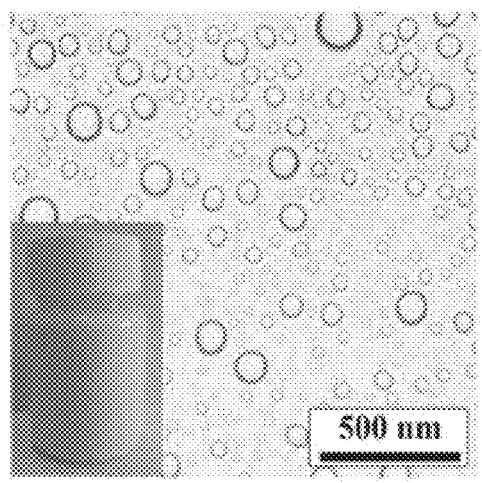
Figure 1E:
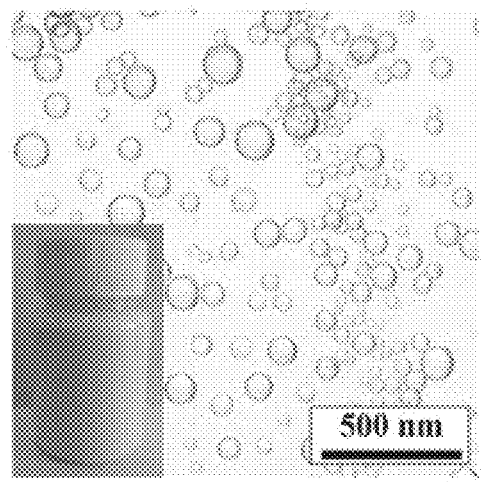
Figure 1F:
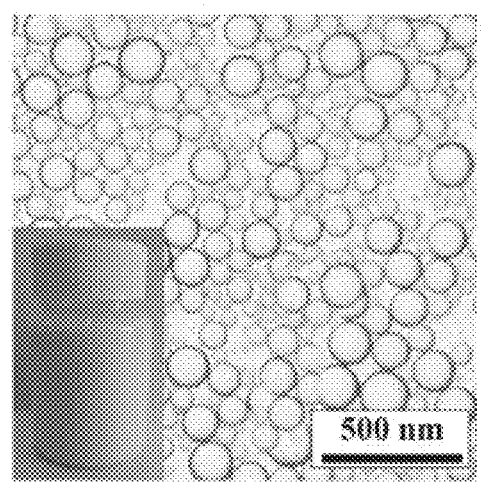
Figure 2A:
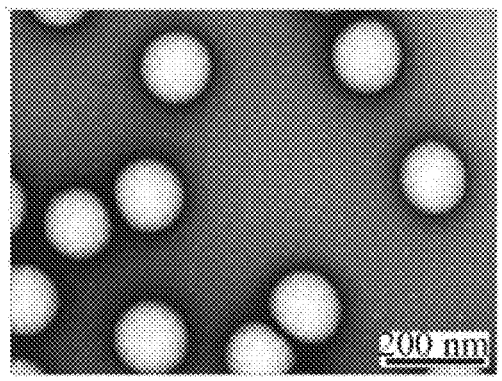
FIG. 2A to FIG. 2F show transmission electron microscopy (TEM) images of the composite emulsions obtained in each experimental group.
Figure 2B:
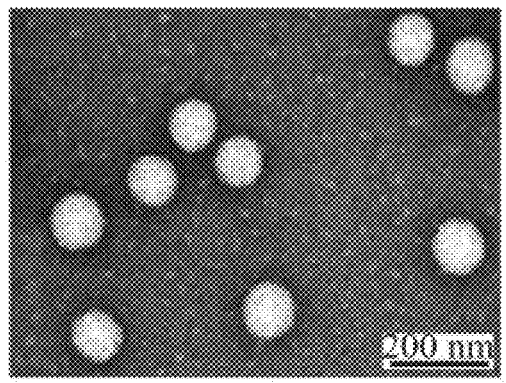
Figure 2C:
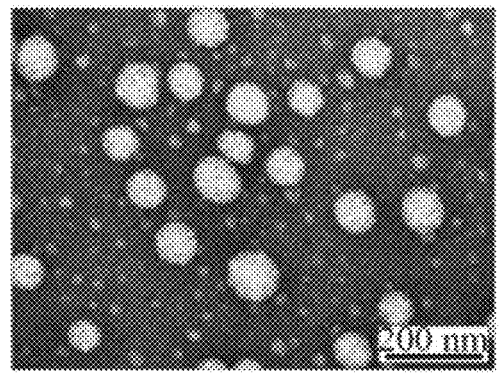
Figure 2D:
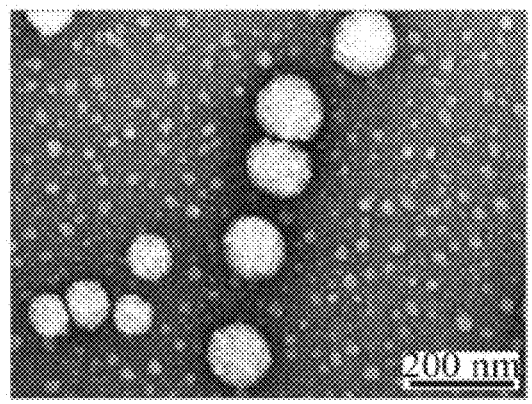
Figure 2E:
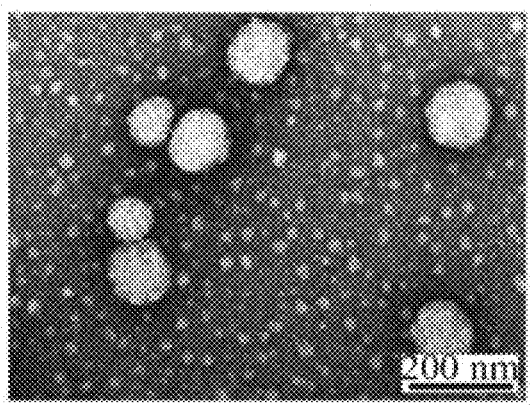
Figure 2F:
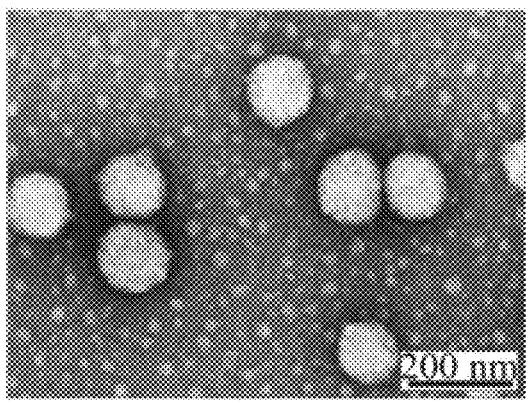
Figure 3A:
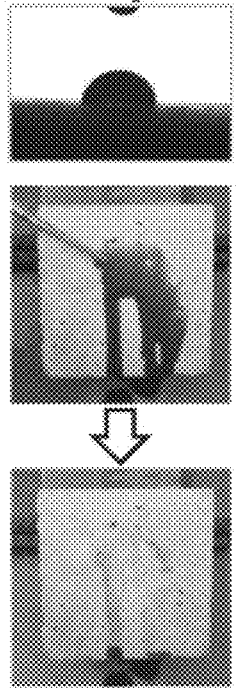
FIG. 3A to FIG. 3F show surface static water contact angle and self-cleaning performance test diagrams of the cement paste specimens in each experimental group.
Figure 3B:
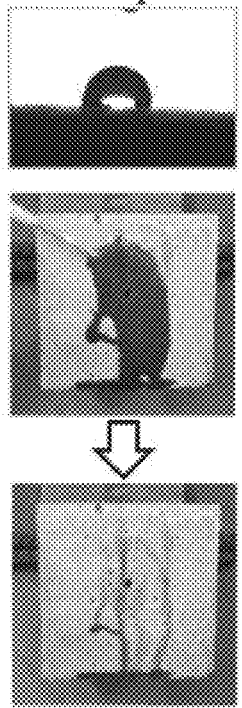
Figure 3C:
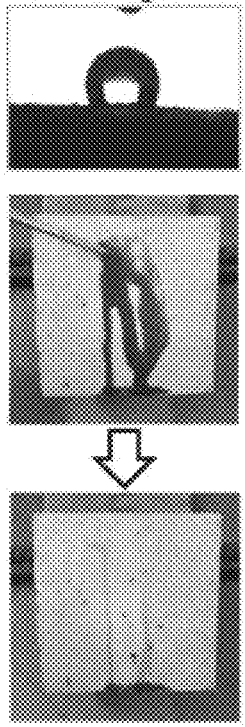
Figure 3D:
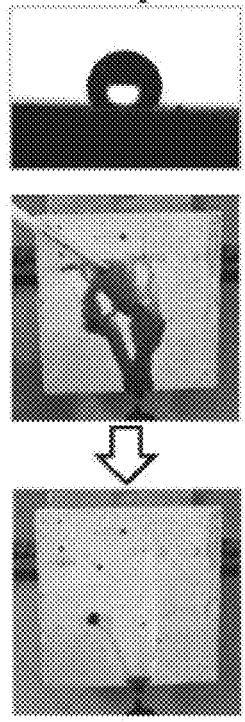
Figure 3E:
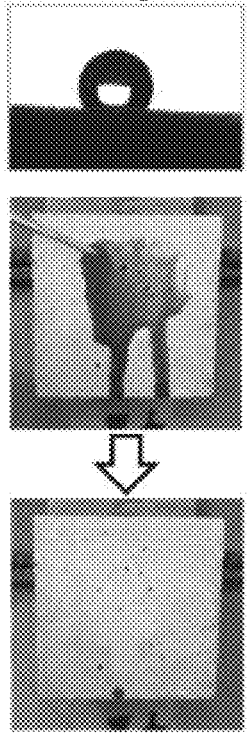
Figure 3F:
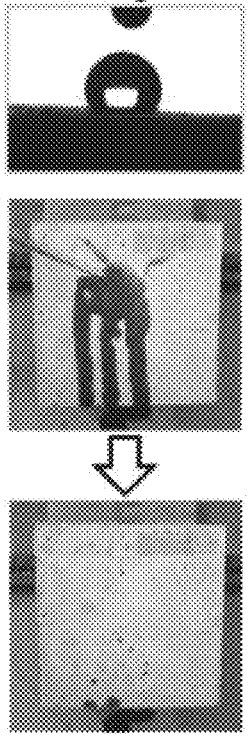

The present disclosure provides a method for preparing a styrene-acrylate siloxane IPN composite emulsion, including:
(1) mixing tetraethyl orthosilicate (TEOS), water, and anhydrous ethanol, and conducting hydrolysis in an alkaline environment to obtain a $SiO_2$ sol;
(2) mixing the $SiO_2$ sol, a buffer, and dopamine hydrochloride, and conducting aminohydroxylation polymerization under an alkaline condition to obtain modified $SiO_2$ particles;
(3) mixing styrene, an acrylate monomer, an acrylate functional monomer, and the modified SiO2 particles to obtain a styrene-acrylate monomer mixed solution I;
(4) mixing styrene, an acrylate monomer, vinylsilane, and the modified $SiO_2$ particles to obtain a styrene-acrylate monomer mixed solution II;
(5) mixing polydimethylsiloxane (PDMS) and liquid paraffin to obtain a silane monomer mixed solution III;
(6) mixing a hydrophobic silane and a regulating silane monomer to obtain a silane monomer mixed solution IV;
(7) mixing the styrene-acrylate monomer mixed solution I, an emulsifier, an initiator, and water, and conducting first addition polymerization to obtain a pre-emulsion A;

(8) mixing the styrene-acrylate monomer mixed solution II, an emulsifier, an initiator, and water, and conducting second addition polymerization to obtain a pre-emulsion B;

(9) mixing the silane monomer mixed solution III, an emulsifier, and water, and conducting third addition polymerization to obtain a pre-emulsion C;

(10) mixing the silane monomer mixed solution IV, an emulsifier, a dispersant, and water, and conducting fourth addition polymerization to obtain a pre-emulsion D;

(11) mixing the pre-emulsion A, the pre-emulsion B, and an initiator, and conducting first polycondensation to obtain a first polycondensation system;

(12) mixing the first polycondensation system, the pre-emulsion C, the modified $SiO_2$ particles, a silane polymerization inhibitor, and an organic solvent, and conducting second polycondensation to obtain a second polycondensation system; and

(13) mixing the second polycondensation system, the pre-emulsion D, the modified $SiO_2$ particles, and an organic solvent, and conducting third polycondensation to obtain the styrene-acrylate siloxane IPN composite emulsion; wherein steps (2), (4), (5), and (6) are conducted in any order;
steps (7), (8), (9), and (10) are conducted in any order; and
in terms of a glass transition temperature, the styrene-acrylate monomer mixed solution I, the styrene-acrylate monomer mixed solution II, the silane monomer mixed solution III, and the silane monomer mixed solution IV are ranked as follows: the styrene-acrylate monomer mixed solution I>the styrene-acrylate monomer mixed solution II>the silane monomer mixed solution III>the silane monomer mixed solution IV.

In some embodiments of the present disclosure, the raw materials provided herein are all commercially available products unless otherwise specified.

In the present disclosure, TEOS, water, and anhydrous ethanol are mixed, and hydrolysis is conducted on a resulting mixture in an alkaline environment to obtain a $SiO_2$ sol. In some embodiments of the present disclosure, the water includes deionized water. In some embodiments of the present disclosure, a mass of the TEOS is 1% to 6% of a mass of the anhydrous ethanol. In some embodiments of the present disclosure, a mass of the water is 50% to 300% of a mass of the TEOS. In some embodiments of the present disclosure, the alkaline environment has a pH value of 7 to 8.5, the alkaline environment is provided by adjusting with an alkaline agent, and the alkaline agent includes one or more selected from the group consisting of ammonia water, sodium bicarbonate, sodium carbonate, sodium hydrogen phosphate, barbital buffer, and an acetate buffer. In some embodiments of the present disclosure, the hydrolysis is conducted at a temperature of 20° C. to 40° C., and preferably 30° C.; and the hydrolysis is conducted for 0.5 h to 2 h. In some embodiments of the present disclosure, the hydrolysis is conducted under stirring, and the stirring is conducted at a speed of 100 r/min to 300 r/min, and preferably 200 r/min.

In the present disclosure, after obtaining the $SiO_2$ sol, the $SiO_2$ sol, a buffer, and dopamine hydrochloride are mixed, and aminohydroxylation polymerization is conducted on a resulting mixture under an alkaline condition to obtain modified $SiO_2$ particles. In some embodiments of the present disclosure, the buffer includes one or more selected from the group consisting of barbital buffer, tris(hydroxymethyl)aminomethane, and an acetate buffer. In some embodiments of the present disclosure, a mass of the buffer is 0.5% to 3% of a mass of the $SiO_2$ sol. In some embodiments of the present disclosure, a mass of the dopamine hydrochloride is 0.1% to 1% of the mass of the $SiO_2$ sol. In some embodiments of the present disclosure, the alkaline condition has a pH value of 7.5 to 8.3. In the present disclosure, mixing the $SiO_2$ sol, the buffer, and the dopamine hydrochloride, and conducting aminohydroxylation polymerization under an alkaline condition is conducted by a process including: subjecting the $SiO_2$ sol to ultrasonic dispersion, and then sequentially adding the buffer and the dopamine hydrochloride, and conducting aminohydroxylation polymerization. In some embodiments of the present disclosure, the ultrasonic dispersion is conducted for 20 min to 60 min. In some embodiments of the present disclosure, the aminohydroxylation polymerization is conducted at room temperature, the aminohydroxylation polymerization is conducted for 0.5 h to 2 h, and the aminohydroxylation polymerization is conducted in an ultrasonic environment. In some embodiments of the present disclosure, after completing the aminohydroxylation polymerization, the method further includes: subjecting a product obtained from the aminohydroxylation polymerization to centrifugation, washing, and drying in sequence. In some embodiments of the present disclosure, the centrifugation is conducted at a speed of 8,000 r/min to 20,000 r/min, and preferably 10,000 r/min, and the centrifugation is conducted for 10 min to 60 min. In some embodiments of the present disclosure, a reagent used for the washing is an ethanol aqueous solution; the ethanol aqueous solution has a mass concentration of 50% to 100%; the washing is conducted 3 to 6 times. In some embodiments of the present disclosure, the drying is conducted at a temperature of 40° C. to 70° C., and preferably 50° C. to 60° C., and the drying is conducted for 6 h. In some embodiments of the present disclosure, the modified $SiO_2$ particles have a fineness of 200 mesh to 800 mesh.

In the present disclosure, styrene, an acrylate monomer, an acrylate functional monomer, and the modified $SiO_2$ particles are mixed to obtain a styrene-acrylate monomer mixed solution I.

In some embodiments of the present disclosure, the acrylate monomer includes one or more selected from the group consisting of methyl acrylate, methyl methacrylate, ethyl acrylate, butyl acrylate, butyl methacrylate, acrylic acid, and hydroxyethyl acrylate. In some embodiments of the present disclosure, the acrylate functional monomer includes hydroxyethyl acrylate and/or hydroxypropyl acrylate, and preferably hydroxyethyl acrylate. In some embodiments of the present disclosure, the acrylate functional monomer in the styrene-acrylate monomer mixed solution I has a mass percentage content of 5% to 20%. In some embodiments of the present disclosure, the styrene in the styrene-acrylate monomer mixed solution I has a mass percentage content of 5% to 20%. In some embodiments of the present disclosure, the modified $SiO_2$ particles in the styrene-acrylate monomer mixed solution I have a mass percentage content of 0.05% to 0.3%. In some embodiments of the present disclosure, mixing the styrene, the acrylate monomer, the acrylate functional monomer, and the modified $SiO_2$ particles is conducted under stirring. In some embodiments of the present disclosure, the styrene-acrylate monomer mixed solution I has a glass transition temperature of 280 K to 300 K.

In the present disclosure, styrene, an acrylate monomer, vinylsilane, and the modified $SiO_2$ particles are mixed to obtain a styrene-acrylate monomer mixed solution II.

In some embodiments of the present disclosure, the acrylate monomer includes one or more selected from the group consisting of methyl acrylate, methyl methacrylate, ethyl acrylate, butyl acrylate, butyl methacrylate, acrylic acid, and hydroxyethyl acrylate. In some embodiments of the present disclosure, the vinylsilane includes one or more selected from the group consisting of vinyltriethoxysilane (VTES), dimethoxymethylvinylsilane, vinyltriisopropoxysilane, and diethoxymethylvinylsilane. In some embodiments of the present disclosure, the styrene in the styrene-acrylate monomer mixed solution II has a mass percentage content of 5% to 20%. In some embodiments of the present disclosure, a mass of the vinylsilane is 10% to 30% of a mass of the acrylate monomer. In some embodiments of the present disclosure, the modified $SiO_2$ particles in the styrene-acrylate monomer mixed solution II have a mass percentage content of 0.05% to 0.3%.

In some embodiments of the present disclosure, the mixing of the styrene, the acrylate monomer, the vinylsilane, and the modified $SiO_2$ particles is conducted under stirring. In some embodiments of the present disclosure, the styrene-acrylate monomer mixed solution II has a glass transition temperature of 250 K to 270 K.

In the present disclosure, PDMS and liquid paraffin are mixed to obtain a silane monomer mixed solution III.

In some embodiments of the present disclosure, the liquid paraffin has a carbon atomic number of 15 to 35, and preferably 20 to 30. In some embodiments of the present disclosure, a mass of the liquid paraffin is 10% to 30%, and preferably 15% to 25% of a mass of the PDMS. In some embodiments of the present disclosure, mixing the PDMS and the liquid paraffin is conducted under stirring. In some embodiments of the present disclosure, the silane monomer mixed solution III has a glass transition temperature of 200 K to 240 K.

In the present disclosure, a hydrophobic silane and a regulating silane monomer are mixed to obtain a silane monomer mixed solution IV.

In some embodiments of the present disclosure, the hydrophobic silane includes one or more selected from the group consisting of n-octyltrimethoxysilane, n-octyltriethoxysilane, dodecyltrimethoxysilane, dodecyltriethoxysilane, and hexadecyltrimethoxysilane. In some embodiments of the present disclosure, the regulating silane monomer includes one or more selected from the group consisting of diphenyldimethoxysilane, diphenyldiethoxysilane, dimethyldimethoxysilane, and dimethyldiethoxysilane. In some embodiments of the present disclosure, a mass of the regulating silane monomer is 3% to 30% of a mass of the hydrophobic silane. In some embodiments of the present disclosure, mixing the hydrophobic silane and the regulating silane monomer is conducted under stirring. In some embodiments of the present disclosure, the silane monomer mixed solution IV has a glass transition temperature of less than 200 K.

In the present disclosure, the styrene-acrylate monomer mixed solution I, an emulsifier, an initiator, and water are mixed, and first addition polymerization is conducted on a resulting mixture to obtain a pre-emulsion A.

In some embodiments of the present disclosure, the emulsifier includes one or more selected from the group consisting of OP-10, sodium dodecyl sulfate, sodium dodecyl sulfonate, and SDBS. In some embodiments of the present disclosure, a mass of the emulsifier is 2% to 8% of a mass of the styrene-acrylate monomer mixed solution I. In some embodiments of the present disclosure, the initiator includes one or more selected from the group consisting of sodium persulfate, ammonium persulfate, potassium persulfate, AIBN, and dimethyl azobisisobutyrate. In some embodiments of the present disclosure, a mass of the initiator is 0.2% to 1.0% of a mass of the styrene-acrylate monomer mixed solution I. In some embodiments of the present disclosure, the water includes deionized water. In some embodiments of the present disclosure, a mass of the water is 60% to 120% of the mass of the styrene-acrylate monomer mixed solution I. In some embodiments of the present disclosure, the first addition polymerization is conducted under a pH value of 7.5 to 8.3, the first addition polymerization is conducted at a temperature of 70° C. to 85° C., and the first addition polymerization is conducted for 20 min to 2 h. In some embodiments of the present disclosure, the first addition polymerization is conducted under stirring, and the stirring is conducted at a speed of 200 r/min to 500 r/min, and preferably 300 r/min to 400 r/min. In some embodiments of the present disclosure, mixing the styrene-acrylate monomer mixed solution I, the emulsifier, the initiator, and the water, and conducting the first addition polymerization is conducted by a process including: mixing the styrene-acrylate monomer mixed solution I and the emulsifier, then adding dropwise to the water, adjusting a pH value of a resulting mixture, starting heating and stirring, adding the initiator thereto, and conducting the first addition polymerization. In some embodiments of the present disclosure, the first addition polymerization starts to time after the initiator is completely added.

In the present disclosure, the styrene-acrylate monomer mixed solution II, an emulsifier, an initiator, and water are mixed, and second addition polymerization is conducted on a resulting mixture to obtain a pre-emulsion B.

In some embodiments of the present disclosure, the emulsifier includes one or more selected from the group consisting of OP-10, sodium dodecyl sulfate, sodium dodecyl sulfonate, and SDBS. In some embodiments of the present disclosure, a mass of the emulsifier is 2% to 8% of a mass of the styrene-acrylate monomer mixed solution II. In some embodiments of the present disclosure, a type and a mass of the initiator are consistent with those of the initiator used in the first addition polymerization, and will not be described in detail here. In some embodiments of the present disclosure, the water includes deionized water. In some embodiments of the present disclosure, a mass of the water is 60% to 120% of a mass of the styrene-acrylate monomer mixed solution II. In some embodiments of the present disclosure, the second addition polymerization is conducted under a pH value of 7.5 to 8.3, the second addition polymerization is conducted at a temperature of 75° C. to 85° C., and the second addition polymerization is conducted for 20 min to 2 h. In some embodiments of the present disclosure, the second addition polymerization is conducted under stirring, and the stirring is conducted at a speed of 200 r/min to 500 r/min, and preferably 300 r/min to 400 r/min. In some embodiments of the present disclosure, mixing the styrene-acrylate monomer mixed solution II, the emulsifier, the initiator, and the water, and conducting the second addition polymerization is conducted by a process including: mixing the styrene-acrylate monomer mixed solution II and the emulsifier, then adding dropwise to the water, adjusting a pH value of a resulting mixture, starting heating and stirring, adding the initiator thereto, and conducting the second addition polymerization. In some embodiments of the present disclosure, the second addition polymerization starts to time after the initiator is completely added.

In the present disclosure, the silane monomer mixed solution III, an emulsifier, and water are mixed, and conducted third addition polymerization to obtain a pre-emulsion C.

In some embodiments of the present disclosure, the emulsifier includes one or more selected from the group consisting of OP-10, Peregal, Span 60, Span 80, Tween 60, and Tween 80, and the Peregal includes Peregal 0-20. In some embodiments of the present disclosure, a mass of the emulsifier is 2% to 8% of a mass of the silane monomer mixed solution III. In some embodiments of the present disclosure, the water includes deionized water. In some embodiments of the present disclosure, a mass of the water is 60% to 100% of the mass of the silane monomer mixed solution III. In some embodiments of the present disclosure, the third addition polymerization is conducted at a temperature of 40° C. to 60° C., and the third addition polymerization is conducted for 20 min to 1 h. In some embodiments of the present disclosure, the third addition polymerization is conducted under stirring, and the stirring is conducted at a speed of 800 r/min to 1,200 r/min, and preferably 1,000 r/min. In some embodiments of the present disclosure, mixing the silane monomer mixed solution III, the emulsifier, and the water, and conducting the third addition polymerization is conducted by a process including: mixing the silane monomer mixed solution III and the emulsifier, then adding dropwise to the water, and conducting the third addition polymerization.

In the present disclosure, the silane monomer mixed solution IV, an emulsifier, a dispersant, and water are mixed, and fourth addition polymerization is conducted on a resulting mixture to obtain a pre-emulsion D.

In some embodiments of the present disclosure, the emulsifier includes one or more selected from the group consisting of OP-10, Peregal, Span 60, Span 80, Tween 60, and Tween 80. In some embodiments of the present disclosure, a mass of the emulsifier is 2% to 8% of a mass of the silane monomer mixed solution IV. In some embodiments of the present disclosure, the dispersant includes one or more selected from the group consisting of sodium dodecyl sulfate, sodium dodecyl sulfonate, SDBS, PVA, PVP, PEG, and glycerol, and preferably PEG. In some embodiments of the present disclosure, a mass of the dispersant is 0.5% to 10% of the mass of the silane monomer mixed solution IV. In some embodiments of the present disclosure, the water includes deionized water. In some embodiments of the present disclosure, a mass of the water is 60% to 100% of a mass of the silane monomer mixed solution IV. In some embodiments of the present disclosure, the fourth addition polymerization is conducted at a temperature of 30° C. to 50° C., and the fourth addition polymerization is conducted for 20 min to 1 h. In some embodiments of the present disclosure, the fourth addition polymerization is conducted under stirring, and the stirring is conducted at a speed of 800 r/min to 1,200 r/min, and preferably 1,000 r/min. In some embodiments of the present disclosure, mixing the silane monomer mixed solution IV, the emulsifier, the dispersant, and the water, and conducting the fourth addition polymerization is conducted by a process including: mixing the silane monomer mixed solution IV, the emulsifier, and the dispersant, then adding dropwise to the water, and conducting the fourth addition polymerization.

In the present disclosure, the pre-emulsion A, the pre-emulsion B, and an initiator are mixed, and first polycondensation is conducted on a resulting mixture to obtain a first polycondensation system.

In some embodiments of the present disclosure, a type of the initiator is consistent with that of the initiator in the second addition polymerization. In some embodiments of the present disclosure, a mass of the initiator is 0.2% to 1% of the mass of the styrene-acrylate monomer mixed solution I. In some embodiments of the present disclosure, the first polycondensation is conducted at a temperature of 75° C. to 85° C., and the first polycondensation is conducted for 1 h to 3 h. In some embodiments of the present disclosure, the first polycondensation is conducted under stirring, and the stirring is conducted at a speed of 200 r/min to 500 r/min, and preferably 300 r/min to 400 r/min. In some embodiments of the present disclosure, the first polycondensation is terminated by adding a chain terminator; and the chain terminator includes one or more selected from the group consisting of hydroquinone, sodium polysulfide, and sodium nitrite. In some embodiments of the present disclosure, a mass of the chain terminator is 0.05% to 0.5% of a mass of the pre-emulsion A. In some embodiments of the present disclosure, mixing the pre-emulsion A, the pre-emulsion B, and the initiator, and conducting the first poly condensation is conducted by a process including: adding the pre-emulsion B and the initiator to the pre-emulsion A, conducting the first polycondensation, and then adding the chain terminator thereto.

In the present disclosure, the first polycondensation system, the pre-emulsion C, the modified $SiO_2$ particles, a silane polymerization inhibitor, and an organic solvent are mixed, and second polycondensation is conducted on a resulting mixture to obtain a second polycondensation system.

In some embodiments of the present disclosure, a mass of the modified $SiO_2$ particles is 0.05% to 0.5% of a mass of the pre-emulsion C. In some embodiments of the present disclosure, the silane polymerization inhibitor includes one or more selected from the group consisting of methoxytrimethylsilane, triethoxymethylsilane, trimethylethoxysilane, and ethoxytriethylsilane. In some embodiments of the present disclosure, a mass of the silane polymerization inhibitor is 2% to 15% of the mass of the pre-emulsion C. In some embodiments of the present disclosure, the organic solvent includes one or more selected from the group consisting of butyl acetate, butyl propionate, trichloroethylene, ethylene glycol ether, and TEA. In some embodiments of the present disclosure, a mass of the organic solvent is 2% to 20% of the mass of the pre-emulsion C. In some embodiments of the present disclosure, the second polycondensation is conducted at a temperature of 30° C. to 50° C., the second polycondensation is conducted for 1 h to 2 h. In some embodiments of the present disclosure, the second polycondensation is conducted under stirring, and the stirring is conducted at a speed of 300 r/min to 600 r/min, and preferably 400 r/min to 500 r/min.

In the present disclosure, the second polycondensation system, the pre-emulsion D, the modified $SiO_2$ particles, and an organic solvent are mixed, and third polycondensation is conducted on a resulting mixture to obtain the styrene-acrylate siloxane IPN composite emulsion.

In some embodiments of the present disclosure, a mass of the modified $SiO_2$ particles is 0.05% to 0.5% of a mass of the pre-emulsion D. In some embodiments of the present disclosure, the organic solvent includes one or more selected from the group consisting of toluene, xylene, n-hexane, pentane, acetone, cyclohexanone, isopropanol, chloroform, trichloroethylene, and butanol. In some embodiments of the present disclosure, a mass of the organic solvent is 2% to 20% of the mass of the pre-emulsion D. In some embodiments of the present disclosure, the third polycondensation is conducted at a temperature of 30° C. to 50° C., and the third polycondensation is conducted for 0.5 h to 2 h. In some embodiments of the present disclosure, the third polycondensation is conducted under stirring, and the stirring is conducted at a speed of 400 r/min to 800 r/min, and preferably 500 r/min to 700 r/min.

The method for preparing a styrene-acrylate siloxane IPN composite emulsion provided by the present disclosure is described below in detail with reference to examples. However, the following description cannot be understood as limiting the scope of the present disclosure.

Example 1

(1) 3 mL of ammonia water was added dropwise to a mixture of 3 g of TEOS, 3 g of deionized water, and 50 g of anhydrous ethanol to adjust a pH value of the mixture to 7 to 8.5. Then an adjusted mixture was stirred at 300 r/min for 30 min at 30° C. to obtain 55 g of a $SiO_2$ sol.

(2) 55 g of the $SiO_2$ sol was pre-dispersed by ultrasonication for 1 h, and 500 mg of tris(hydroxymethyl)aminomethane and 200 mg of dopamine hydrochloride were added to the pre-dispersed $SiO_2$ sol successively. Then a resulting mixture was dispersed by ultrasonication at 30° C. for 2 h, and centrifuged at 10,000 r/min for 60 min. A precipitate was separated, collected, and washed 3 times with a 50% ethanol aqueous solution. A washed precipitate was dried at 50° C. for 6 h to obtain modified $SiO_2$ particles with a fineness of 300 mesh to 800 mesh.

(3) 15 g of methyl methacrylate, 15 g of butyl acrylate, 5 g of acrylic acid, 10 g of styrene, 5 g of hydroxyethyl acrylate, and 50 mg of the modified $SiO_2$ particles were mixed and stirred evenly to obtain a styrene-acrylate monomer mixed solution I, with a glass transition temperature of 290±3 K.

(4) 10 g of methyl methacrylate, 20 g of butyl acrylate, 5 g of acrylic acid, 10 g of styrene, 5 g of VTES, and 50 mg of the modified $SiO_2$ particles were mixed and stirred evenly to obtain a styrene-acrylate monomer mixed solution II, with a glass transition temperature of 260±3 K.

(5) 10 g of PDMS and 3 g of liquid paraffin (having a carbon number of 20 to 30) were mixed and stirred evenly to obtain a silane monomer mixed solution III, with a glass transition temperature of 220±5 K.

(6) 40 g of n-octyltriethoxysilane, 2 g of diphenyldimethoxysilane, and 2 g of dimethyldiethoxysilane were mixed and stirred evenly to obtain a silane monomer mixed solution IV, with a glass transition temperature of less than 200 K.

(7) 50 g of the styrene-acrylate monomer mixed solution I, 1.2 g of OP-10, and 1.8 g of sodium dodecyl sulfate were mixed and then added dropwise to 50 g of deionized water. A pH value of a resulting mixture was adjusted to 7.5 with sodium bicarbonate. An adjusted mixture was stirred at 78° C. and 300 r/min, while 400 mg of ammonium persulfate was slowly added thereto during the stirring. After complete addition of the ammonium persulfate, stirring was continued for 2 h to obtain a pre-emulsion A.

(8) 50 g of the styrene-acrylate monomer mixed solution II, 1.8 g of OP-10, and 1.2 g of sodium dodecyl sulfate were mixed and then added dropwise to 50 g of deionized water. A pH value of a resulting mixture was adjusted to 7.5 with sodium bicarbonate. An adjusted mixture was stirred at 78° C. and 300 r/min, and 400 mg of ammonium persulfate was slowly added thereto during the stirring. After complete addition of the ammonium persulfate, stirring was continued for 90 min to obtain a pre-emulsion B.

(9) 20 g of the silane monomer mixed solution III, 300 mg of OP-10, and 300 mg of Peregal 0-25 were mixed and added dropwise to 16 g of deionized water. A resulting mixture was stirred at 1,000 r/min for 1 h at 40° C. to obtain a pre-emulsion C.

(10) 50 g of the silane monomer mixed solution IV, 750 mg of Tween 80, 750 mg of Span 80, and 400 mg of PEG were mixed and added dropwise to 40 g of deionized water. A resulting mixture was stirred at 1,000 r/min for 1 h at 40° C. to obtain a pre-emulsion D.

(11) The pre-emulsion B and 300 mg of ammonium persulfate were slowly added to the pre-emulsion A at 83° C. A resulting mixture was stirred at 300 r/min for 2 h, and then 200 mg of hydroquinone was added to the mixture.

(12) A resulting mixture was cooled to 50° C., stirred at 500 r/min. 5 g of butyl acetate, 35 g of the pre-emulsion C, and 50 mg of the modified $SiO_2$ particles were simultaneously added dropwise to the stirred mixture, followed by adding 2 g of methoxytrimethylsilane thereto and stirring for 1 h.

(13) A resulting mixture was cooled to 40° C. 90 g of the pre-emulsion D, 3 g of cyclohexanone, and 50 mg of the modified $SiO_2$ particles were slowly added dropwise to the cooled mixture, and stirred at 600 r/min for 2 h to obtain a styrene-acrylate siloxane IPN composite emulsion.

Example 2

(1) 3 mL of ammonia water was added dropwise to a mixture of 3 g of TEOS, 3 g of deionized water, and 50 g of anhydrous ethanol to adjust a pH value of the mixture to 7 to 8.5. Then an adjusted mixture was stirred at 300 r/min for 30 min at 30° C. to obtain 55 g of a $SiO_2$ sol.

(2) 55 g of the $SiO_2$ sol was pre-dispersed by ultrasonication for 1 h, and 500 mg of barbital buffer and 200 mg of dopamine hydrochloride were added to the pre-dispersed $SiO_2$ sol successively. Then a resulting mixture was dispersed by ultrasonication at 30° C. for 2 h, and centrifuged, and separated at 10,000 r/min for 60 min. A precipitate was separated, collected, and washed 3 times with a 50% ethanol aqueous solution. A washed precipitate was dried at 50° C. for 6 h to obtain modified $SiO_2$ particles s with a fineness of 300 mesh to 800 mesh.

(3) 15 g of methyl acrylate, 15 g of butyl acrylate, 5 g of acrylic acid, 10 g of styrene, 5 g of hydroxyethyl acrylate, and 100 mg of the modified SiO2 particles were mixed and stirred evenly to obtain a styrene-acrylate monomer mixed solution I, with a glass transition temperature of 285±3K.

(4) 10 g of methyl acrylate, 20 g of butyl acrylate, 5 g of acrylic acid, 10 g of styrene, 5 g of VTES, and 100 mg of the modified $SiO_2$ particles were mixed and stirred evenly to obtain a styrene-acrylate monomer mixed solution II, with a glass transition temperature of 255±3K.

(5) 10 g of PDMS and 3 g of liquid paraffin (having a carbon number of 20 to 30) were mixed and stirred evenly to obtain a silane monomer mixed solution III, with a glass transition temperature of 220±5K.

(6) 40 g of n-octyltriethoxysilane, 2 g of diphenyldimethoxysilane, and 2 g of dimethyldiethoxysilane were mixed and stirred evenly to obtain a silane monomer mixed solution IV, with a glass transition temperature of less than 200 K.

(7) 50 g of the styrene-acrylate monomer mixed solution I, 1.2 g of OP-10, and 1.8 g of sodium dodecyl sulfonate were mixed and then added dropwise to 50 g of deionized water. A pH value of a resulting mixture was adjusted to 7.5 with sodium bicarbonate. An adjusted mixture was stirred at 78° C. and 300 r/min, while 400 mg of ammonium persulfate was slowly added thereto during the stirring. After complete addition of the ammonium persulfate, stirring was continued for 2 h to obtain a pre-emulsion A.

(8) 50 g of the styrene-acrylate monomer mixed solution II, 1.8 g of OP-10, and 1.2 g of sodium dodecyl sulfonate were mixed and then added dropwise to 50 g of deionized water. A pH value of a resulting mixture was adjusted to 7.5 with sodium bicarbonate. An adjusted mixture was stirred at 78° C. and 300 r/min, and 400 mg of ammonium persulfate was slowly added thereto during the stirring. After complete addition of the ammonium persulfate, stirring was continued for 90 min to obtain a pre-emulsion B.

(9) 20 g of the silane monomer mixed solution III, 300 mg of OP-10, and 300 mg of Peregal 0-20 were mixed and added dropwise to 16 g of deionized water. A resulting mixture was stirred at 1,000 r/min for 1 h at 40° C. to obtain a pre-emulsion C.

(10) 50 g of the silane monomer mixed solution IV, 750 mg of Tween 60, 750 mg of Span 60, and 400 mg of PEG were mixed and added dropwise to 40 g of deionized water. A resulting mixture was stirred at 1,000 r/min for 1 h at 40° C. to obtain a pre-emulsion D.

(11) The pre-emulsion B and 300 mg of ammonium persulfate were slowly added to the pre-emulsion A at 83° C. A resulting mixture was stirred at 300 r/min for 2 h, and then 200 mg of hydroquinone was added to the mixture.

(12) A resulting mixture was cooled to 50° C., stirred at 500 r/min. 5 g of butyl acetate, 35 g of the pre-emulsion C, and 100 mg of the modified $SiO_2$ particles were simultaneously added dropwise to the stirred mixture, followed by adding 2 g of trimethylethoxysilane thereto and stirring for 1 h.

(13) A resulting mixture was cooled to 40° C. 90 g of the pre-emulsion D, 3 g of cyclohexanone, and 100 mg of the modified $SiO_2$ particles were slowly added dropwise to the cooled mixture, and stirred at 600 r/min for 2 h to obtain a styrene-acrylate siloxane IPN composite emulsion.

Example 3

(1) 3 mL of ammonia water was added dropwise to a mixture of 3 g of TEOS, 3 g of deionized water, and 50 g of anhydrous ethanol to adjust a pH value of the mixture to 7 to 8.5. Then an adjusted mixture was stirred at 300 r/min for 30 min at 30° C. to obtain 55 g of a $SiO_2$ sol.

(2) 55 g of the $SiO_2$ sol was pre-dispersed by ultrasonication for 1 h, and 500 mg of tris(hydroxymethyl)aminomethane and 200 mg of dopamine hydrochloride were added to the pre-dispersed $SiO_2$ sol successively. Then a resulting mixture was dispersed by ultrasonication at 30° C. for 2 h, and centrifuged at 10,000 r/min for 60 min. A precipitate was separated, collected, and washed 3 times with a 50% ethanol aqueous solution. A washed precipitate was dried at 50° C. for 6 h to obtain modified $SiO_2$ particles s with a fineness of 300 mesh to 800 mesh.

(3) 15 g of methyl acrylate, 15 g of butyl acrylate, 5 g of acrylic acid, 10 g of styrene, 5 g of hydroxyethyl acrylate, and 150 mg of the modified $SiO_2$ particles were mixed and stirred evenly to obtain a styrene-acrylate monomer mixed solution I, with a glass transition temperature of 290±3K.

(4) 10 g of methyl methacrylate, 20 g of butyl acrylate, 5 g of acrylic acid, 10 g of styrene, 5 g of VTES, and 150 mg of the modified $SiO_2$ particles were mixed and stirred evenly to obtain a styrene-acrylate monomer mixed solution II, with a glass transition temperature of 260±3K.

(5) 10 g of PDMS and 3 g of liquid paraffin (having a carbon number of 20 to 30) were mixed and stirred evenly to obtain a silane monomer mixed solution III, with a glass transition temperature of 220±5K.

(6) 40 g of n-octyltriethoxysilane, 2 g of diphenyldimethoxysilane, and 2 g of dimethyldiethoxysilane were mixed and stirred evenly to obtain a silane monomer mixed solution IV, with a glass transition temperature of less than 200 K.

(7) 50 g of the styrene-acrylate monomer mixed solution I, 1.2 g of OP-10, and 1.8 g of SDBS were mixed and then added dropwise to 50 g of deionized water. A pH value of a resulting mixture was adjusted to 7.5 with sodium bicarbonate. An adjusted mixture mixture was stirred at 78° C. and 300 r/min, and 400 mg of ammonium persulfate was slowly added thereto during the stirring. After complete addition of the ammonium persulfate, stirring was continued for 2 h to obtain a pre-emulsion A.

(8) 50 g of the styrene-acrylate monomer mixed solution II, 1.8 g of OP-10, and 1.2 g of SDBS were mixed and then added dropwise to 50 g of deionized water. A pH value of a resulting mixture was adjusted to 7.5 with sodium bicarbonate. An adjusted mixture mixture was stirred at 78° C. and 300 r/min, and 400 mg of ammonium persulfate was slowly added thereto during the stirring. After complete addition of the ammonium persulfate, stirring was continued for 90 min to obtain a pre-emulsion B.

(9) 20 g of the silane monomer mixed solution III, 300 mg of OP-10, and 300 mg of Peregal 0-20 were mixed and added dropwise to 16 g of deionized water. A resulting mixture was stirred at 1,000 r/min for 1 h at 40° C. to obtain a pre-emulsion C.

(10) 50 g of the silane monomer mixed solution IV, 750 mg of Tween 80, 750 mg of Span 60, and 400 mg of PEG were mixed and added dropwise to 40 g of deionized water. A resulting mixture was stirred at 1,000 r/min for 1 h at 40° C. to obtain a pre-emulsion D.

(11) The pre-emulsion B and 300 mg of potassium persulfate were slowly added to the pre-emulsion A at 83° C. A resulting mixture was stirred at 300 r/min for 2 h, and then 200 mg of sodium nitrite was added to the mixture.

(12) A resulting mixture was cooled to 50° C., stirred at 500 r/min, and 5 g of butyl propionate, 35 g of the pre-emulsion C, and 150 mg of the modified $SiO_2$ particles were simultaneously added dropwise to the stirred mixture, followed by adding 2 g of ethoxytriethylsilane thereto and stirring for 1 h.

(13) A resulting mixture was cooled to 40° C., and 90 g of the pre-emulsion D, 3 g of cyclohexanone, and 150 mg of the modified $SiO_2$ particles were slowly added dropwise to the cooled mixture, and stirred at 600 r/min for 2 h to obtain a styrene-acrylate siloxane IPN composite emulsion.

Comparative Example 1

In this comparative example, a pure styrene-acrylate emulsion was prepared in a manner similar to that of Example 1, except for omitting the preparation of the modified SiO$_2$ particles in steps (1) to (2), the preparation of the silane monomer mixed solution in steps (5) to (6), the preparation of the pre-emulsion C and pre-emulsion D in steps (9) to (10), and the preparation of the IPN emulsion in steps (12) to (13).

Comparative Example 2

In this comparative example, a styrene-acrylate silicone blend emulsion was prepared in a similar manner to that of Example 1, except for omitting the preparation of the IPN emulsion in steps (11) to (13), and the two styrene-acrylate pre-emulsions prepared in steps (7) to (10) were directly mixed with the two siloxane pre-emulsions. A resulting mixture was stirred at 83° C. and 300 r/min for 2 h, and then stirred at 50° C. and 800 r/min for 3 h.

Comparative Example 3

In this comparative example, a styrene-acrylate silicone composite emulsion was prepared in a similar manner to that of Example 3, except for omitting the preparation of the modified SiO$_2$ particles in step (1) to step (2), and not adding the modified SiO$_2$ particles in step (3) to step (4) and step (12) to step (13). A styrene-acrylate siloxane IPN composite emulsion was directly prepared without the regulation of the modified SiO$_2$ particles.

Performance Testing

The composite emulsions prepared according to the present disclosure were coated on the surface of cement-based material specimens twice in an amount of 600 g/m$^2$, with an interval of not less than 6 hours between the two times.

FIG. 1A to FIG. 1F show apparent morphology photos and optical microscope morphology photos of the composite emulsions obtained in each experimental group. As shown in FIG. 1A to FIG. 1F, the styrene-acrylate siloxane IPN composite emulsions prepared according to the present disclosure have excellent homogeneity and stability, and do not occur flocculation, stratification, or separation phenomenons after being placed for a long time. In addition, compared with the comparative examples, the particles in the styrene-acrylate siloxane IPN composite emulsions prepared in Examples 1 to 3 have higher dispersibility and more concentrated particle size distribution, and the aggregation and fusion between the latex particles are significantly alleviated.

FIG. 2A to FIG. 2F show TEM images of the composite emulsions obtained in each experimental group. As shown in FIG. 2A to FIG. 2F, the styrene-acrylate siloxane IPN composite emulsions prepared in Examples 1 to 3 have a characteristic of particle size gradient variation, but there is no significant difference in the particle size variation, indicating that an ordered and stable IPN structural system has been formed. Compared with Comparative Examples 2 and 3, the particles in the styrene-acrylate siloxane IPN composite emulsions in Examples 1 to 3 have greater interaction forces.

1. Basic Properties of Emulsion

TABLE 1

Basic properties parameters of composite emulsions in each experimental group

| | Comparative Example 1 | Comparative Example 2 | Comparative Example 3 | Example 1 | Example 2 | Example 3 |
|---|---|---|---|---|---|---|
| Solid content | 45.1% | 39.2% | 42.4% | 45.8% | 46.8% | 47.3% |
| Gel rate | 1.4% | 1.6% | 1.4% | 1.1% | 1.0% | 1.2% |
| Monomer conversion rate | 86.8% | 86.6% | 85.7% | 87.3% | 88.4% | 88.9% |

As shown in Table 1, the solid content of the styrene-acrylate siloxane IPN composite emulsions prepared in Examples 1 to 3 is significantly higher than that in Comparative Example 1, Comparative Example 2, and Comparative Example 3. The gel rates of the styrene-acrylate siloxane IPN composite emulsions prepared in Examples 1 to 3 are all below 1.2, indicating that no flocculation or explosion occurred in the composite emulsions during the synthesis, which fully ensures the desirable curing and film-forming properties of the composite emulsions. The monomer conversion rates of the styrene-acrylate siloxane IPN composite emulsions prepared in Examples 1 to 3 are all above 87.3%, indicating that the method for preparing the styrene-acrylate siloxane IPN composite emulsion provided by the present disclosure could maintain the relatively independent chain polymerization reactions between the styrene-acrylate component and the siloxane component while improving the synergistic effect between the two components.

TABLE 2

Stability of composite emulsions in each experimental group

| | Comparative Example 1 | Comparative Example 2 | Comparative Example 3 | Example 1 | Example 2 | Example 3 |
|---|---|---|---|---|---|---|
| Centrifugal stability | Relatively excellent | Poor | Relatively excellent | Relatively excellent | Relatively excellent | Relatively excellent |

TABLE 2-continued

Stability of composite emulsions in each experimental group

|  | Comparative Example 1 | Comparative Example 2 | Comparative Example 3 | Example 1 | Example 2 | Example 3 |
|---|---|---|---|---|---|---|
| Dilution stability | Excellent | Relatively excellent | Relatively excellent | Relatively excellent | Excellent | Excellent |
| $Ca^{2+}$ stability | Excellent | Poor | Poor | Relatively excellent | Excellent | Excellent |
| Low-temperature stability | Relatively poor | Poor | Relatively poor | Relatively excellent | Relatively excellent | Relatively excellent |
| High-temperature stability | Relatively excellent | Poor | Relatively excellent | Relatively excellent | Excellent | Excellent |

As shown in Table 2, the styrene-acrylate siloxane IPN composite emulsions prepared in Examples 1 to 3 have better stability than that in Comparative Examples 1 to 3, showing desirable dilution stability, $Ca^{2+}$ stability, and high-temperature stability, among which the styrene-acrylate siloxane IPN composite emulsion prepared in Example 3 has the best overall stability. The centrifugal stability and low-temperature stability of the styrene-acrylate siloxane IPN composite emulsions prepared in Examples 1 to 3 are significantly better than those in Comparative Examples 1 to 3, indicating that the styrene-acrylate component and the siloxane component in the prepared styrene-acrylate siloxane IPN composite emulsion have excellent binding effect and synergistic working performance.

TABLE 3

Swelling rate of coatings made of composite emulsions in each experimental group

| Comparative Example 1 | Comparative Example 2 | Comparative Example 3 | Example 1 | Example 2 | Example 3 |
|---|---|---|---|---|---|
| 30.4% | 66.7% | 57.5% | 47.2% | 43.3% | 40.1% |

As shown in Table 3, the swelling rate of the coatings made of styrene-acrylate siloxane IPN composite emulsions prepared in Examples 1 to 3 is higher than that in Comparative Example 1, indicating that the construction of IPN is conducive to promoting the penetration of siloxane molecules into the styrene-acrylate component and ensuring the effective combination of the styrene-acrylate main network and the siloxane molecules. At the same time, the swelling ratio of the styrene-acrylate siloxane IPN composite emulsions prepared in Examples 1 to 3 is significantly lower than that in Comparative Examples 2 and 3, indicating that the modified $SiO_2$ particles could reduce the transmission path of the water molecules in the styrene-acrylate siloxane composite system through cross-linking and various non-bonding effects.

2. Hydrophobicity and Waterproof Properties of Emulsion

The static contact angle and the rolling angle of a water drop dropped on the surface of a cement paste specimen coated with the composite emulsion were measured using a static surface contact angle meter. 5 different points were measured on each specimen and an average value was taken.

FIG. 3A to FIG. 3F show surface static water contact angle and self-cleaning performance test diagrams of the cement paste specimens in each experimental group.

TABLE 4

Static water contact angle on surfaces of cement specimens in each experimental group

|  | Comparative Example 1 | Comparative Example 2 | Comparative Example 3 | Example 1 | Example 2 | Example 3 |
|---|---|---|---|---|---|---|
| Contact angle/° | 81.6 | 104.3 | 112.8 | 120.4 | 122.7 | 134.7 |

As shown in FIG. 3A to FIG. 3F and Table 4, compared with Comparative Examples 1 to 3, the static contact angle on the surface of the specimens in Examples 1 to 3 is increased to more than 120°, showing excellent hydrophobic properties. In addition, the surface of the concrete specimens treated with the styrene-acrylate siloxane IPN composite emulsions prepared in Examples 1 to 3 allows water droplets to slide freely at a rolling angle of about 5°, indicating that the styrene-acrylate siloxane IPN composite emulsion could form a stable self-cleaning surface on the cement matrix.

One non-casting surface of a dry concrete cube specimen was selected as a coating surface, and its four sides were sealed with epoxy resin. The specimen was placed with a coated surface facing downward in distilled water, with the coated surface approximately 5 mm to 10 mm above a horizontal plane, and the static capillary water absorption of the concrete specimen was measured at different water absorption times.

Figure 4:
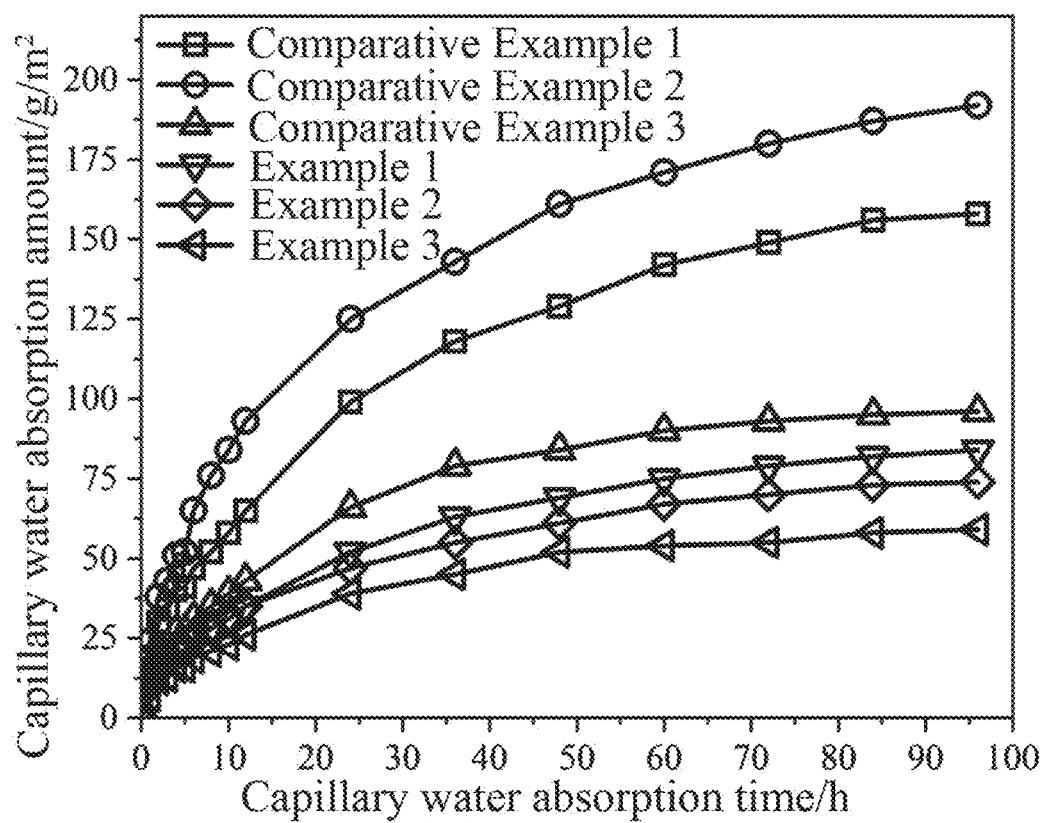
FIG. 4 is a diagram showing curves of the static capillary water absorption of the concrete specimens in each experimental group.
Figure 5A:
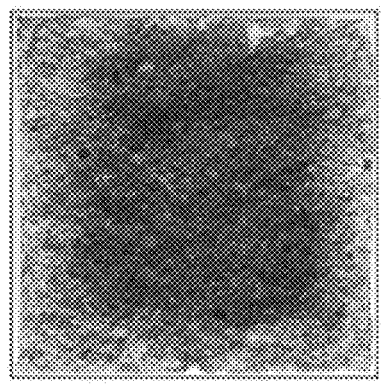
FIG. 5A to FIG. 5F show diagrams of carbonization depth test results of the cement mortar specimens in each experimental group.
Figure 5B:
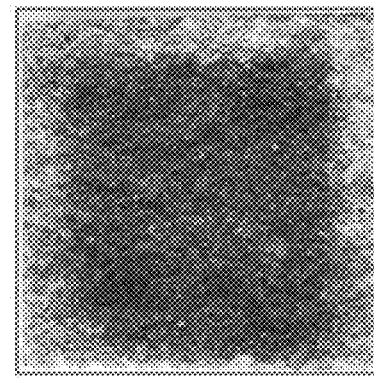
Figure 5C:
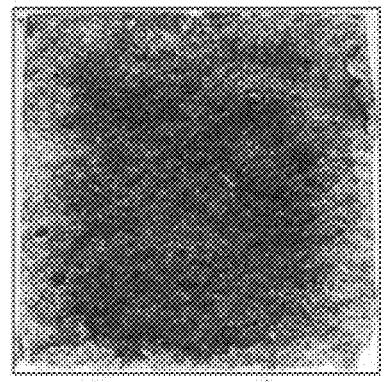
Figure 5D:
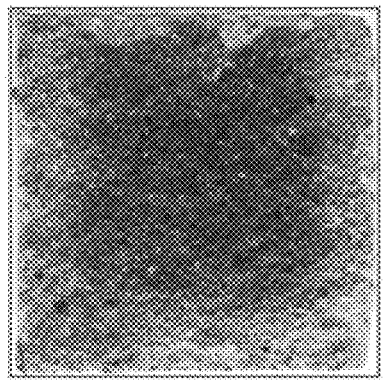
Figure 5E:
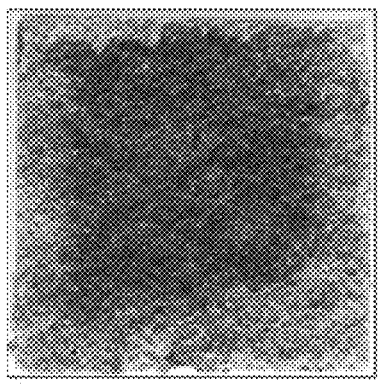
Figure 5F:
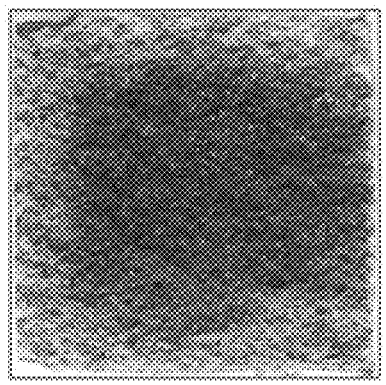
Figure 6A:
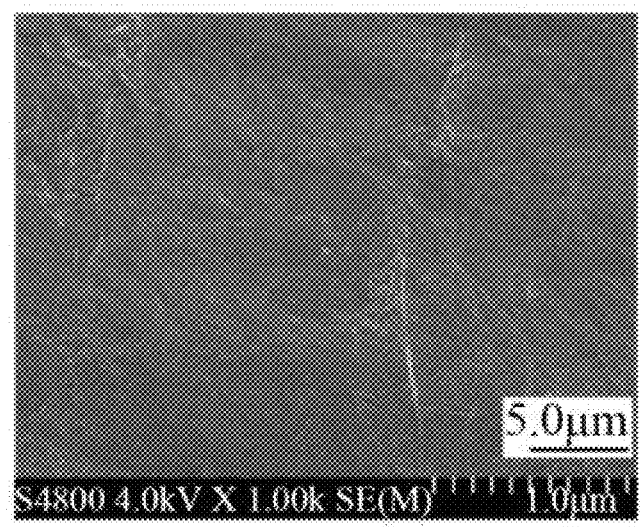
FIG. 6A to FIG. 6F show scanning electron microscopy (SEM) images of the surfaces of the coatings made of the composite emulsions of each experimental group.
Figure 6B:
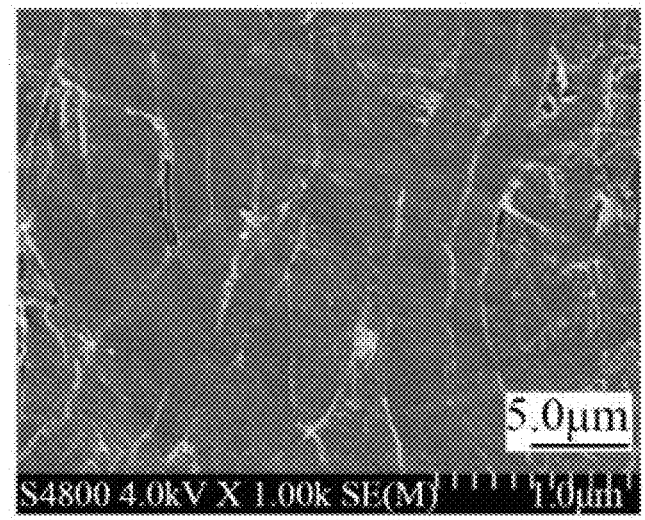
Figure 6C:
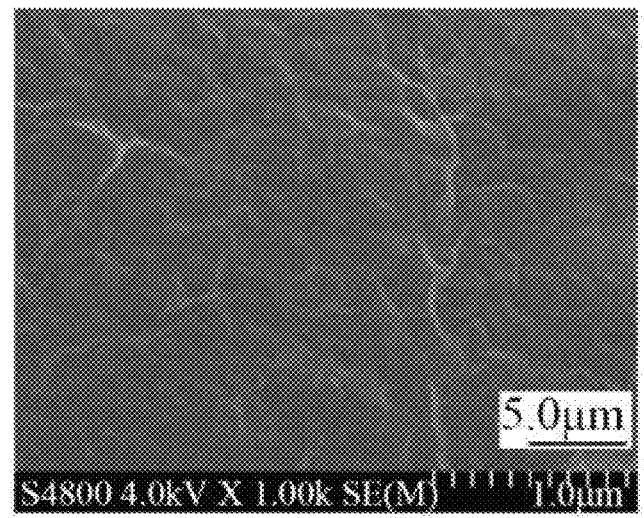
Figure 6D:
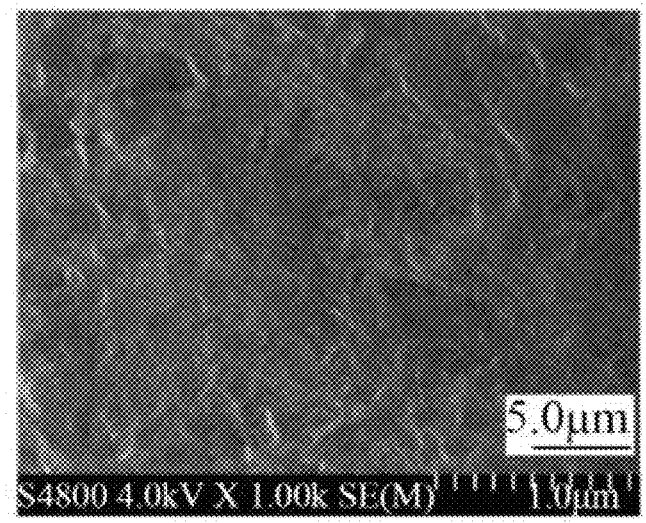
Figure 6E:
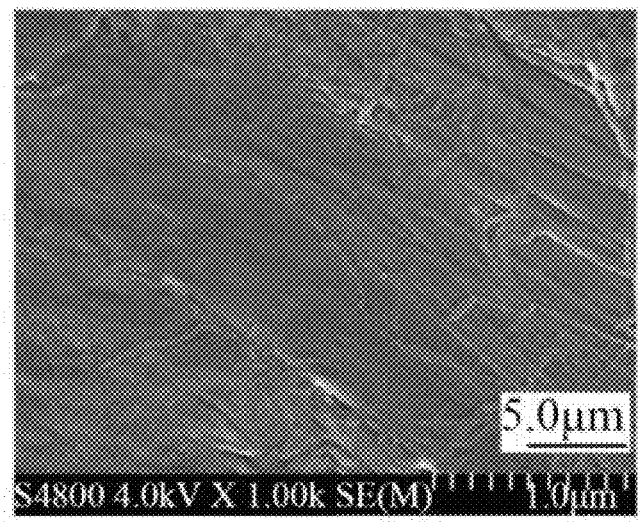
Figure 6F:
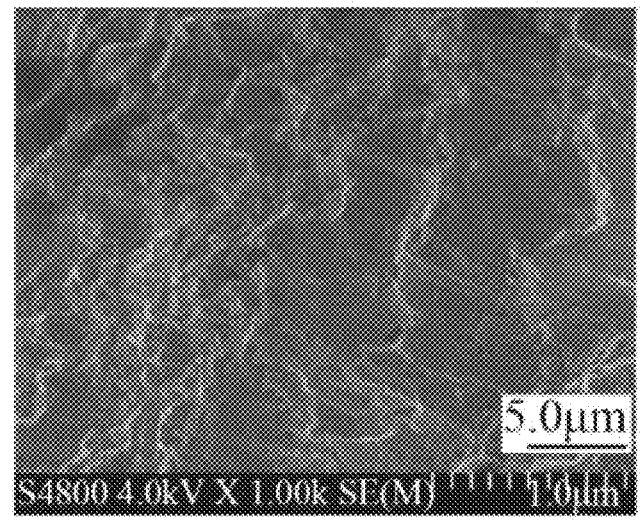

FIG. 4 is a diagram showing curves of the static capillary water absorption of the concrete specimens in each experimental group.

TABLE 5

Static capillary water absorption of concrete specimens in each experimental group at 24 h (g · m$^{-2}$ · h$^{-0.5}$)

| | Comparative Example 1 | Comparative Example 2 | Comparative Example 3 | Example 1 | Example 2 | Example 3 |
|---|---|---|---|---|---|---|
| Capillary water absorption rate | 25.8 | 31.6 | 23.7 | 20.1 | 18.7 | 17.3 |

It can be seen from FIG. 4 and Table 5 that the concrete specimen coated with the styrene-acrylate siloxane IPN composite emulsion prepared according to the present disclosure has a static capillary water absorption rate that is greatly reduced compared with the concrete specimens coated with the polymer emulsions prepared in Comparative Examples 1, 2, and 3. Compared with a pure styrene-acrylate emulsion, the static capillary water absorption in Examples 1, 2, and 3 decreases by 22.1%, 27.5%, and 32.9%, respectively, among which the static capillary water absorption of Example 3 decreases the most. This indicates that the IPN structure regulated by modified nano-SiO$_2$ particle could give the coating made of the styrene-acrylate siloxane IPN composite emulsion a more superior waterproof performance.

3. Anti-Chlorine Salt Erosion and Anti-Sulfate Erosion Properties of Concrete

The specimens were immersed in 10% NaCl and Na$_2$SO$_4$ solutions separately using a method similar to the static capillary water absorption test. The penetration of chloride and sulfate ions was tested on day 50.

It can be seen from Table 6 that the amount of chloride ion corrosion and the amount of sulfate ion corrosion of the concrete specimens treated with the styrene-acrylate siloxane IPN composite emulsion are greatly decreased. Compared with the concrete specimens treated with an ordinary styrene-acrylate emulsion, the chloride ion corrosions of Examples 1, 2, and 3 are reduced by 24.9%, 30.1%, and 32.7%, respectively, and the sulfate ion corrosions are reduced by 17.8%, 20.5%, and 24.3%, respectively, among which the chloride ion and sulfate ion corrosions of Example 3 are reduced to the greatest extent. In addition, Table 7 also shows that the corrosion potentials of the coatings made of the styrene-acrylate siloxane IPN composite emulsions prepared in Examples 1 to 3 under chloride and sulfate corrosion are higher than those in Comparative Examples 1 to 3, and their corrosion potentials in a sulfate environment are even higher. In particular, the absolute values of the corrosion potentials of the coating made of the styrene-acrylate siloxane IPN composite emulsion prepared in Example 3 under chloride and sulfate attack reached 0.3V and 0.4V, respectively. This indicated that IPN regulated by nanoma-

TABLE 6

Amounts of chloride ion corrosion and sulfate ion corrosion of concretes in each experimental group (g · m$^{-2}$)

| | Comparative Example 1 | Comparative Example 2 | Comparative Example 3 | Example 1 | Example 2 | Example 3 |
|---|---|---|---|---|---|---|
| Amount of Cl$^-$ corrosion | 502 | 647 | 420 | 377 | 351 | 338 |
| Amount of SO$_4^{2-}$ corrosion | 366 | 428 | 322 | 301 | 291 | 277 |

TABLE 7

Corrosion potentials of composite coatings in each experimental group under chloride and sulfate corrosion (-V)

| | Comparative Example 1 | Comparative Example 2 | Comparative Example 3 | Example 1 | Example 2 | Example 3 |
|---|---|---|---|---|---|---|
| Cl$^-$ corrosion potential | 0.27 | 0.21 | 0.26 | 0.29 | 0.31 | 0.32 |
| SO$_4^{2-}$ corrosion potential | 0.33 | 0.27 | 0.32 | 0.37 | 0.38 | 0.41 | terials could effectively block or extend the transmission path of corrosive ions, and inhibit their diffusion and transmission in the capillary channels and cracks inside the concrete.

4. Acid and Alkali Corrosion Resistance

The latex films prepared in each experimental group were soaked in a dilute hydrochloric acid solution with pH=3 and a sodium hydroxide solution with pH=12 for 72 h separately, and the mass loss rate and resistance modulus thereof were measured.

TABLE 8

Mass loss rate of latex films in each experimental group under acid corrosion and alkali corrosion

|  | Comparative Example 1 | Comparative Example 2 | Comparative Example 3 | Example 1 | Example 2 | Example 3 |
| --- | --- | --- | --- | --- | --- | --- |
| Acid corrosion | 47% | 59% | 42% | 37% | 35% | 33% |
| Alkali corrosion | 28% | 32% | 26% | 22% | 20% | 17% |

As shown in Table 8, the mass loss rate of the coating films made of the styrene-acrylate siloxane IPN composite emulsions of Examples 1 to 3 under acid corrosion and alkali corrosion is less than that of Comparative Examples 1 to 3, indicating that the coating made of the styrene-acrylate siloxane IPN composite emulsion has more superior performance in resisting acid and alkali corrosion and more outstanding alkali corrosion resistance. With the increase in the content of modified nanomaterials, the acid and alkali resistance of the coating made of the styrene-acrylate siloxane IPN composite emulsion is gradually improved, and the mass loss rate of Example 3 could be controlled below 33% and 17%, respectively.

TABLE 9

Resistance modulus of latex films in each experimental group under acid and alkali corrosion/×$10^5$ $\Omega \cdot cm^{-2}$

|  | Comparative Example 1 | Comparative Example 2 | Comparative Example 3 | Example 1 | Example 2 | Example 3 |
| --- | --- | --- | --- | --- | --- | --- |
| Acid corrosion | 4.02 | 3.45 | 4.31 | 4.53 | 4.55 | 4.62 |
| Alkali corrosion | 6.46 | 5.53 | 6.70 | 6.98 | 7.03 | 7.15 |

As shown in Table 9, compared with the styrene-acrylate emulsion and the blended emulsion in Comparative Examples 1 and 2, the styrene-acrylate siloxane IPN composite emulsions prepared in Examples 1 to 3 have a larger resistance modulus under acid and alkali corrosion, indicating that the polar ionization reaction does not have a significant adverse effect on the overall stability of the IPN structure. Therefore, it is ensured that the coating made of the styrene-acrylate siloxane IPN composite emulsion could have a sustained and stable protective effect on the cement matrix in an acid and alkali corrosion environment.

5. Anti-Carbonization Performance

The composite emulsion prepared in each experimental group was coated on each surface of the cement mortar cube specimen, and then the mortar specimen was placed in a dedicated carbonation test box, and the carbon dioxide concentration in the box was set to (20±2)%. The carbonization depth of the mortar specimens was tested after 28 d of carbonization.

FIG. 5A to FIG. 5F show carbonization depth test diagrams of cement mortar specimens of each experimental group.

TABLE 10

Carbonation depth (mm) of cement mortar specimens in each experimental group at 28 d carbonation age

|  | Comparative Example 1 | Comparative Example 2 | Comparative Example 3 | Example 1 | Example 2 | Example 3 |
| --- | --- | --- | --- | --- | --- | --- |
| Carbonation depth | 7.0 | 7.9 | 4.6 | 3.2 | 2.6 | 2.4 |

FIG. 5A to FIG. 5F and Table 10 clearly show that the cement mortar specimens corresponding to Examples 1 to 3 have a smaller carbonization depth, indicating that the coating made of the styrene-acrylate siloxane IPN composite emulsion could not only resist the attack of water molecule clusters and corrosive ions, but also effectively inhibit the diffusion and transmission of $CO_2$ gas small molecules inside, thereby maintaining the alkaline environment in the cement matrix.

6. Anti-Aging Resistance

The latex films prepared by each experimental group were continuously irradiated for 72 h under artificial UV rays with an irradiance of 50 w/m$^2$ and a wavelength of 254 nm, and then a surface gloss loss rate and a crosslinking density loss rate were measured.

TABLE 11

| | Comparative Example 1 | Comparative Example 2 | Comparative Example 3 | Example 1 | Example 2 | Example 3 |
|---|---|---|---|---|---|---|
| Surface gloss loss rate and crosslinking density loss rate/% of the latex films in each group | | | | | | |
| Gloss loss rate | 84.6 | 76.9 | 68.6 | 61.6 | 59.3 | 57.7 |
| Crosslinking density loss rate | 25.3 | 26.6 | 23.7 | 21.4 | 19.9 | 18.8 |

As shown in Table 11, the surface gloss loss rate and crosslinking density loss rate of the coating made of the styrene-acrylate emulsion in Comparative Example 1 are relatively high, and the anti-aging properties of the composite coatings prepared in Comparative Examples 2 and 3 are not ideal. Obviously, the coatings made of styrene-acrylate siloxane IPN composite emulsions prepared in Examples 1 to 3 have smaller gloss loss rate and crosslinking density loss rate, which gradually decrease with the increase of the content of modified $SiO_2$ particles. The surface gloss loss rate and crosslinking density loss rate of Example 3 reach minimum, which are only 57.7% and 18.8%, respectively, indicating the coating made of the styrene-acrylate siloxane IPN composite emulsion prepared in Example 3 has the best anti-aging performance.

7. Surface Microstructure of Composite Coating

The surface microscopic features of the coatings made of the composite emulsions prepared in each experimental group were observed by SEM.

FIG. 6A to FIG. 6F show SEM images of the surfaces of the coatings made of the composite emulsions in each experimental group.

As shown in FIG. 6A to FIG. 6F, the surface of the coating made of the styrene-acrylate emulsion prepared in Comparative Example 1 is relatively smooth, whereas the composite coating prepared by the blending method obviously has more cracks and holes. The surface of the IPN emulsion coating prepared in Comparative Example 3 has a smooth surface similar to that of the coating in Comparative Example 1. Examples 1 to 3 show that the coating made of the styrene-acrylate siloxane IPN composite emulsion regulated by modified $SiO_2$ has excellent surface integrity and a certain degree of roughness, indicating that the nanoparticles could give the composite coating a layered wrinkled structure, which is beneficial to further improve the hydrophobicity of the coating surface.

The above are merely preferred embodiments of the present disclosure. It should be noted that a person of ordinary skill in the art may further make several improvements and modifications without departing from the principle of the present disclosure, but such improvements and modifications should be deemed as falling within the scope of the present disclosure.

What is claimed is:

1. A method for preparing a styrene-acrylate siloxane interpenetrating polymer network (IPN) composite emulsion, comprising:
   (1) mixing tetraethyl orthosilicate (TEOS), water, and anhydrous ethanol, and conducting hydrolysis in an alkaline environment to obtain a $SiO_2$ sol;
   (2) mixing the $SiO_2$ sol, a buffer, and dopamine hydrochloride, and conducting aminohydroxylation polymerization under an alkaline condition to obtain modified $SiO_2$ particles;
   (3) mixing styrene, an acrylate monomer, an acrylate functional monomer, and the modified $SiO_2$ particles to obtain a styrene-acrylate monomer mixed solution I;
   (4) mixing styrene, an acrylate monomer, vinylsilane, and the modified $SiO_2$ particles to obtain a styrene-acrylate monomer mixed solution II;
   (5) mixing polydimethylsiloxane (PDMS) and liquid paraffin to obtain a silane monomer mixed solution III;
   (6) mixing a hydrophobic silane and a regulating silane monomer to obtain a silane monomer mixed solution IV;
   (7) mixing the styrene-acrylate monomer mixed solution I, an emulsifier, an initiator, and water, and conducting first addition polymerization to obtain a pre-emulsion A;
   (8) mixing the styrene-acrylate monomer mixed solution II, an emulsifier, an initiator, and water, and conducting second addition polymerization to obtain a pre-emulsion B;
   (9) mixing the silane monomer mixed solution III, an emulsifier, and water, and conducting third addition polymerization to obtain a pre-emulsion C;
   (10) mixing the silane monomer mixed solution IV, an emulsifier, a dispersant, and water, and conducting fourth addition polymerization to obtain a pre-emulsion D;
   (11) mixing the pre-emulsion A, the pre-emulsion B, and an initiator, and conducting first poly condensation to obtain a first poly condensation system;
   (12) mixing the first polycondensation system, the pre-emulsion C, the modified $SiO_2$ particles, a silane polymerization inhibitor, and an organic solvent, and conducting second poly condensation to obtain a second polycondensation system; and
   (13) mixing the second polycondensation system, the pre-emulsion D, the modified $SiO_2$ particles, and an organic solvent, and conducting third polycondensation to obtain the styrene-acrylate siloxane IPN composite emulsion; wherein
   steps (2), (4), (5), and (6) are conducted in any order;
   steps (7), (8), (9), and (10) are conducted in any order; and
   in terms of a glass transition temperature, the styrene-acrylate monomer mixed solution I, the styrene-acrylate monomer mixed solution II, the silane monomer mixed solution III, and the silane monomer mixed solution IV are ranked as follows: the styrene-acrylate monomer mixed solution I>the styrene-acrylate monomer mixed solution II>the silane monomer mixed solution III>the silane monomer mixed solution IV;
   in step (3):
   the acrylate monomer comprises one or more selected from the group consisting of methyl acrylate, methyl methacrylate, ethyl acrylate, butyl acrylate, butyl methacrylate, acrylic acid, and hydroxyethyl acrylate, and the acrylate functional monomer comprises one or more selected from the group consisting of hydroxyethyl acrylate and hydroxypropyl acrylate; the styrene in the styrene-acrylate monomer mixed solution I has a mass percentage of 5% to 20%, the acrylate functional monomer in the styrene-acrylate monomer mixed solution I has a mass percentage of 5% to 20%, and the modified SiO2 particles in the styrene-acrylate monomer mixed solution I have a mass percentage of 0.05% to 0.3%;

in step (4):

the acrylate monomer comprises one or more selected from the group consisting of methyl acrylate, methyl methacrylate, ethyl acrylate, butyl acrylate, butyl methacrylate, acrylic acid, and hydroxyethyl acrylate, and the vinylsilane comprises one or more selected from the group consisting of vinyltriethoxysilane (VTES), dimethoxymethylvinylsilane, vinyltriisopropoxysilane, and diethoxymethylvinylsilane; the styrene in the styrene-acrylate monomer mixed solution II has a mass percentage of 5% to 20%, a mass of the vinylsilane is 10% to 30% of a mass of the acrylate monomer, and the modified SiO2 particles in the styrene-acrylate monomer mixed solution II have a mass percentage of 0.05% to 0.3%;

in step (5):

a mass of the liquid paraffin is 10% to 30% of a mass of the PDMS, and the liquid paraffin has a carbon atomic number of 15 to 35;

in step (6):

the hydrophobic silane comprises one or more selected from the group consisting of n-octyltrimethoxysilane, n-octyltriethoxysilane, dodecyltrimethoxysilane, dodecyltriethoxysilane, and hexadecyltrimethoxysilane;

the regulating silane comprises one or more selected from the group consisting of diphenyldimethoxysilane, diphenyldiethoxysilane, dimethyldimethoxysilane, and dimethyldiethoxysilane; and a mass of the regulating silane monomer is 3% to 30% of a mass of the hydrophobic silane;

in step (7): a mass of the emulsifier is 2% to 8% of a mass of the styrene-acrylate monomer mixed solution I, a mass of the initiator is 0.2% to 1.0% of the mass of the styrene-acrylate monomer mixed solution I, the first addition polymerization is conducted under a pH value of 7.5 to 8.3, and the first addition polymerization is conducted at a temperature of 70° C. to 85° C. for 20 min to 2 h;

in step (8): a mass of the emulsifier is 2% to 8% of a mass of the styrene-acrylate monomer mixed solution II, the second addition polymerization is conducted under a pH value of 7.5 to 8.3, and the second addition polymerization is conducted at a temperature of 75° C. to 85° C. for 20 min to 2 h;

in step (9): a mass of the emulsifier is 2% to 8% of a mass of the silane monomer mixed solution III, and the third addition polymerization is conducted at a temperature of 40° C. to 60° C. for 20 min to 1 h;

in step (10): a mass of the emulsifier is 2% to 8% of a mass of the silane monomer mixed solution IV, a mass of the dispersant is 0.5% to 10% of the mass of the silane monomer mixed solution IV, and the fourth addition polymerization is conducted at a temperature of 30° C. to 50° C. for 20 min to 1 h;

in step (11): a mass of the initiator is 0.2% to 1% of a mass of the styrene-acrylate monomer mixed solution I, and the first poly condensation is conducted at a temperature of 75° C. to 85° C. for 1 h to 3 h;

in step (12): a mass of the modified SiO2 particles is 0.05% to 0.5% of a mass of the pre-emulsion C, a mass of the silane polymerization inhibitor is 2% to 15% of the mass of the pre-emulsion C, a mass of the organic solvent is 2% to 20% of the mass of the pre-emulsion C, and the second polycondensation is conducted at a temperature of 30° C. to 50° C. for 1 h to 2 h;

in step (13): a mass of the modified SiO2 particles is 0.05% to 0.5% of a mass of the pre-emulsion D, and a mass of the organic solvent is 2% to 20% of the mass of the pre-emulsion D; and the third poly condensation is conducted at a temperature of 30° C. to 50° C. for 0.5 h to 2 h.

2. The method of claim 1, wherein in step (7):

the emulsifier comprises one or more selected from the group consisting of OP-10, sodium dodecyl sulfate, sodium dodecyl sulfonate, and sodium dodecyl benzene sulfonate (SDBS); and the initiator comprises one or more selected from the group consisting of sodium persulfate, ammonium persulfate, potassium persulfate, azobisisobutyronitrile (AIBN), and dimethyl azobisisobutyrate.

3. The method of claim 1, wherein in step (8):

the emulsifier comprises one or more selected from the group consisting of OP-10, sodium dodecyl sulfate, sodium dodecyl sulfonate, and SDBS; and a type and a mass of the initiator are consistent with the type and the mass of the initiator in step (7).

4. The method of claim 1, wherein in step (9):

the emulsifier comprises one or more selected from the group consisting of OP-10, Peregal, Span 60, Span 80, Tween 60, and Tween 80.

5. The method of claim 1, wherein in step (10):

the emulsifier comprises one or more selected from the group consisting of OP-10, Peregal, Span 60, Span 80, Tween 60, and Tween 80; and the dispersant comprises one or more selected from the group consisting of sodium dodecyl sulfate, sodium dodecyl sulfonate, SDBS, polyvinyl alcohol (PVA), polyvinylpyrrolidone (PVP), polyethylene glycol (PEG), and glycerol.

6. The method of claim 1, wherein in step (11):

a type of the initiator is consistent with the type of the initiator in step (8).

7. The method of claim 1, wherein in step (12):

the silane polymerization inhibitor is one or more selected from the group consisting of methoxytrimethylsilane, triethoxymethylsilane, trimethylethoxysilane, and ethoxytriethylsilane; and the organic solvent comprises one or more selected from the group consisting of butyl acetate, butyl propionate, trichloroethylene, ethylene glycol ether, and triethanolamine (TEA).

8. The method of claim 1, wherein in step (13):

the organic solvent comprises one or more selected from the group consisting of toluene, xylene, n-hexane, pentane, acetone, cyclohexanone, isopropanol, chloroform, trichloroethylene, and butanol.

\* \* \* \* \*